(12) United States Patent
Frank

(10) Patent No.: US 6,478,461 B1
(45) Date of Patent: Nov. 12, 2002

(54) TRANSPORTABLE HOT-MIX ASPHALT MANUFACTURING AND POLLUTION CONTROL SYSTEM

(75) Inventor: Robert E. Frank, Linwood, NJ (US)

(73) Assignee: RAP Technologies, Inc., Lindwood, NJ (US)

( * ) Notice: Subject to any disclaimer, the term of this patent is extended or adjusted under 35 U.S.C. 154(b) by 0 days.

(21) Appl. No.: 09/482,608

(22) Filed: Jan. 14, 2000

(51) Int. Cl.$^7$ ................................................ B28C 5/00
(52) U.S. Cl. ............................. 366/25; 34/135; 34/137; 432/111; 96/297; 96/232; 96/233; 96/364
(58) Field of Search .............................. 366/22, 23, 24, 366/25, 4, 7; 432/111, 117; 34/135, 137; 96/297, 232, 233, 364; 95/224, 225, 214

(56) References Cited

U.S. PATENT DOCUMENTS

| | | | |
|---|---|---|---|
| 3,866,888 A | * | 2/1975 | Dydzyk |
| 4,190,370 A | * | 2/1980 | Brock et al. |
| 4,211,490 A | | 7/1980 | Brock et al. |
| 4,309,113 A | | 1/1982 | Mendenhall |
| 4,600,379 A | | 7/1986 | Elliott |
| 4,802,139 A | | 1/1989 | Sasaki |
| 4,867,572 A | | 9/1989 | Brock et al. |
| 4,892,411 A | | 1/1990 | Elliott et al. |
| 4,913,552 A | | 4/1990 | Bracegirdle |
| 5,041,274 A | * | 8/1991 | Kagi, Sr. |
| 5,083,870 A | * | 1/1992 | Sindelar et al. |
| 5,090,813 A | | 2/1992 | McFarland et al. |
| 5,174,650 A | | 12/1992 | McFarland et al. |
| 5,188,299 A | | 2/1993 | Hendrickson et al. |
| 5,201,839 A | | 4/1993 | Swisher, Jr. |
| 5,294,062 A | | 3/1994 | Hendrickson et al. |
| 5,352,275 A | | 10/1994 | Nath et al. |
| 5,378,060 A | | 1/1995 | Brock et al. |
| 5,520,124 A | | 5/1996 | Amon |
| 5,579,587 A | | 12/1996 | Morrison et al. |
| 5,620,249 A | | 4/1997 | Musil |
| 5,634,712 A | | 6/1997 | Musil |
| 5,737,849 A | | 4/1998 | Morrison et al. |
| 5,810,471 A | | 9/1998 | Nath et al. |
| 5,902,040 A | | 5/1999 | Catlett |
| 5,904,904 A | | 5/1999 | Swanson |
| 5,922,290 A | * | 7/1999 | Jenne et al. |

FOREIGN PATENT DOCUMENTS

WO       9729168       8/1997

OTHER PUBLICATIONS

Broschure entitled Advanced Environmental Systems "Control Asphalt Emissions Efficiently & Economically", Date not available.

* cited by examiner

Primary Examiner—Joseph W. Drodge
Assistant Examiner—Terry K. Cecil
(74) Attorney, Agent, or Firm—Schweitzer Cornman Gross & Bondell LLP

(57) ABSTRACT

A hot-mix asphalt manufacturing system including treatment of emissions and recirculated gases includes a counterflow rotary dryer 12 having a combustion chamber 28, an inlet 24 for dry ingredients, an outlet 26 for hot-mix asphalt, and a plate collector 70 for treating recirculated gases. A fiber bed filter 90 (FIG. 5) is provided to remove hydrocarbons and particulates from the rotary dryer emissions before they are released into the surrounding environment. A cooling zone 92 is provided upstream from the fiber bed filter to cool the emissions to a temperature that is compatible with the fiber bed filter.

53 Claims, 9 Drawing Sheets

TRANSPORTABLE HOT-MIX ASPHALT MANUFACTURING AND POLLUTION CONTROL SYSTEM

BACKGROUND OF THE INVENTION

The present invention relates to a transportable hot-mix asphalt manufacturing system and method, and more specifically, to a hot-mix manufacturing system that is relatively compact and transportable to sites where the hot-mix asphalt is to be manufactured. The present invention also relates to compact pollution control systems and pollution control methods for a hot-mix asphalt manufacturing system.

While techniques and systems for manufacturing hot-mix asphalt are generally known, typically the systems used to manufacture the hot-mix asphalt include large, cumbersome components that must remain stationary and that are not easily disassembled and/or transported should it become necessary to manufacture the hot-mix asphalt at another location. An example of such large, cumbersome components is the typical conventional rotary dryer and its associated pollution control equipment.

Asphalt plants with rotary dryers are well-known in the art. Such asphalt plants, however, tend to suffer from at least one of several disadvantages. Among the disadvantages are that: 1) they are excessively, complex, large or bulky and cannot be transported easily to a location where the hot-mix asphalt is needed, 2) they use excessively expensive, complicated, and/or large pollution control devices (some of which require frequent maintenance and monitoring), and/or 3) they are not compatible with recycled asphalt products (RAP) or cannot accept commingled RAP and virgin asphalt aggregates.

Conventional rotary dryers typically use cyclones, knock-out boxes, large bag houses, and/or other space-consuming pollution control devices to process the emissions from the rotary dryers. Still other rotary dryers use expensive and/or complicated thermal oxidizers, indirect heating systems where the RAP aggregate is not exposed to the heated air, or a second rotary dryer into which the polluted exhaust gases are inserted and diluted or burned. Notably, thermal oxidizer-based systems tend to be very expensive, bulky, and have large operating costs because of their high energy requirements. Indirect heating systems tend to be thermo-dynamically inefficient, expensive to build, and very limited in production rates. Systems that depend on a second rotary dryer disadvantageously prevent one rotary dryer from being used without another.

The space-consuming pollution control devices typically are not easy to disassemble and transport. Often transportation of such devices requires a significant amount of disassembly and/or unusual transportation equipment and techniques. The combined weight and/or size of a typical rotary dryer and its associated pollution control devices usually exceeds the size and/or weight restrictions of wide-load trucking in the United States. It therefore is difficult, if not impossible, to transport such systems using fewer than three truckloads, and without any complicated and time-consuming disassembly of the rotary dryer and its associated pollution control equipment.

There is consequently a need in the art for a hot-mix asphalt manufacturing system, such as a rotary dryer and its associated pollution control equipment, that can be transported in fewer than three truck loads, without complicated disassembly of the manufacturing system. Since wide-load trucking requires official permits, escorts, and can be performed only within certain regulatory limits, the use of wide-load trucking tends to be far more expensive, time-consuming, and less practical than conventional trucking. Conventional trucking (i.e., trucking without escorts and without wide-load designations) can be performed, according to U.S. regulations, when the load is no larger than 8 feet, 6 inches wide by 13 feet, 6 inches high by 53 feet long. The need for a transportable hot-mix asphalt manufacturing system therefore further extends to one that, without complicated disassembly of the manufacturing system, does not require loads that exceed the dimensional limits of conventional trucking, and preferably one that can be transported in fewer than three such conventional truck-loads.

If a rotary dryer is capable of handling recycled asphalt product (RAP), it typically will be configured with an external combustion chamber to protect the contents of the dryer's drum from the combustion process that is used to generate heat. The cumulative length of the rotary dryer therefore typically includes the length of the dryer's rotatable drum plus the length of the external combustion chamber. The additional length contributed by the combustion chamber usually precludes the rotary dryer from being transported using conventional trucking in a single truck-load. The aforementioned need to provide a readily transportable hot-mix manufacturing system therefore extends to one that has a rotary dryer with a combustion chamber does not contribute significantly, if at all, to the length of the rotary dryer.

While there are some pollution control devices that are more compact, less expensive, and/or less maintenance intensive than the pollution control devices typically found on a conventional rotary dryer, such devices generally have not found, their way into the rotary dryer industry. Presumably, this is because of perceived incompatibilities with the emissions from the typical rotary dryer. Plate collectors, for example, though they are fairly compact and inexpensive, are not used as pollution control equipment in the typical rotary dryer. It is generally perceived that plate collectors would be overburdened and/or clogged by the particulates in the exhaust gas of the typical rotary dryer. This is especially so if the plate collector is to be located in the recirculated exhaust gas stream of a rotary dryer. It is generally perceived that excessive maintenance and/or replacement of the plate collectors would be necessary if such collectors were used to remove particulate from the recirculated exhaust gas stream.

While plate collectors can be cleaned by continuously spraying them with water, such "wet" processing generally is not used in the context of rotary dryers because the emissions from such rotary dryers typically are treated in bag houses or using other fabric-based filters. Such bag-houses and other fabric-based filters typically are incompatible with condensed water. When such fabric-based filters are used, it is typically necessary that any moisture in the filtered emissions remain in the vapor state.

Likewise, fiber bed filters are not generally used to treat the pollution from the typical hot-mix rotary dryer. Presumably, this is, in part, because of the temperature limitations imposed by the use of such fiber bed filters. The typical fiber bed filter is not compatible with hot emissions that exceed a temperature of about 120 degrees F. It is not unusual for the emission temperature from a rotary dryer to exceed 200 degrees F. Since the emissions from the typical hot-mix rotary dryer far exceed the 120-degree temperature limitation, the general perception in the industry of hot-mix manufacturing is that fiber bed filters are not suitable for use as pollution control equipment in a hot-mix rotary dryer.

While some fiber bed filters have been provided with evaporative cooling systems, whereby water is sprayed through the emissions and evaporates to draw heat away from the emissions, the use of such fiber bed filters in the asphalt industry generally has been limited to treatment of relatively low-moisture asphalt emissions (e.g., emissions from shingle manufacturing and asphalt storage facilities) having a much lower moisture content than the emissions from the typical hot-mix rotary dryer. While evaporative cooling can be effective with low-moisture emissions, such evaporative cooling techniques alone generally are not effective in the context of the moisture-saturated emissions from the typical rotary dryer. In particular, the typical emissions from the rotary dryer can accept little, if any, additional moisture. Fiber bed filters therefore, even if augmented to include evaporative cooling systems, generally have not been used to treat the emissions from a hot-mix rotary dryer.

Another problem with conventional hot-mix asphalt manufacturing systems and methods, relates to the restrictions imposed on their feed material. Many conventional hot-mix manufacturing cold feed systems, for example, are not compatible with recycled asphalt products (RAP). In the few rotary dryers and associated techniques that can handle significant amounts of RAP, the RAP and virgin aggregates typically must be fed into the rotatable drum of the rotary dryer through different inlets of the drum. The RAP and virgin aggregates therefore cannot be commingled in the typical system or method. Because it is generally more convenient to feed the RAP and virgin aggregates into a rotary dryer from the same location and/or inlet, there is a need in the art for a hot-mix manufacturing technique and/or system that includes a rotary dryer capable of receiving the raw materials in the form of commingled RAP and virgin aggregates and/or in the form of 100% RAP.

SUMMARY OF THE INVENTION

It is a primary object of the present invention to overcome at least one of the foregoing problems and/or satisfy at least one of the foregoing needs by providing a transportable hot-mix asphalt manufacturing system and method, a method and system for treating emissions from a hot-mix asphalt manufacturing system, and a method and system for treating recirculated gases in a hot-mix asphalt manufacturing system.

To achieve these and other objects, the present invention provides a transportable hot-mix asphalt manufacturing system comprising a rotary dryer and at least one pollution control device. The rotary dryer is adapted to receive and dry ingredients of hot-mix asphalt. The pollution control device(s) is (are) adapted to treat emissions from the rotary dryer so that hydrocarbons and particulates are substantially removed from the emissions of the rotary dryer before such emissions are released into a surrounding environment of the rotary dryer. The pollution control device(s) and the rotary dryer have dimensions that permit use of conventional trucking to transport the rotary dryer and the pollution control device(s) in less than three conventional truck-loads.

Also provided by the present invention is a counter-flow rotary dryer for a hot-mix asphalt manufacturing system. The counter-flow rotary dryer comprises a rotatable drum, an inlet, a combustion chamber, and a heat shield. The rotatable drum has a first end and an opposite end. The inlet is for raw ingredients of hot-mix asphalt. The inlet is located at or near the first end of the rotary dryer. The combustion chamber is internal to the rotatable drum of the rotary dryer and is radially spaced apart from an inside circumferential wall of the rotatable drum, to provide a mixing zone between the combustion chamber and the inside circumferential wall. The heat shield is adapted to protect the raw ingredients of hot-mix asphalt from radiant heat developed in the combustion chamber. The counter-flow rotary dryer is adapted to receive the raw ingredients of hot-mix asphalt through the inlet for passage through the rotatable drum toward the opposite end thereof, while combustion gases from the combustion chamber flow substantially from the opposite end of the rotary dryer toward the first end to heat and dry the raw ingredients.

Also provided by the present invention is a rotary dryer for a hot-mix asphalt manufacturing system, wherein the rotary dryer comprises a rotatable drum, a combustion chamber, a recirculator, and a plate collector. The rotatable drum has a first end and an opposite end. The combustion chamber is located at or near the opposite end. The recirculator is adapted to recirculate some combustion gases at the first end back to the combustion chamber at or near the opposite end. The plate collector is adapted to substantially remove particulates from combustion gases that are recirculated by the recirculator.

According to another aspect of the present invention, a hot-mix asphalt manufacturing system can be provided with a rotary dryer and at least one pollution control device that includes a fiber bed filter. The rotary dryer is adapted to receive and dry ingredients of hot-mix asphalt. The pollution control device(s) is (are) adapted to treat emissions from the rotary dryer so that hydrocarbons and particulates are substantially removed from the emissions of the rotary dryer before such emissions are released into a surrounding environment of the rotary dryer.

Also provided by the present invention is a transportable hot-mix asphalt manufacturing system comprising a counter-flow rotary dryer, a plate collector, a fiber bed filter, a cooling zone, a heat exchanger, a coolant recovery mechanism, and a plate collector sprayer. The counter-flow rotary dryer is adapted to receive and dry ingredients of hot-mix asphalt. The counter-flow rotary dryer includes a combustion chamber and a recirculator adapted to recirculate emissions from the rotary dryer into the combustion chamber. The combustion chamber is internal to the rotary dryer and is radially spaced apart from an inside circumferential wall of the rotary dryer, to provide a mixing zone between the combustion chamber and the inside circumferential wall. The plate collector is adapted to remove particulates from emissions that are recirculated into the combustion chamber by the recirculator. The fiber bed filter is adapted to treat emissions from the rotary dryer so that hydrocarbons and particulates are substantially removed from the emissions of the rotary dryer before such emissions are released into a surrounding environment of the rotary dryer. The cooling zone is located between the rotary dryer and the fiber bed filter. The cooling zone is adapted to cool the emissions from the rotary dryer enough that such emissions achieve a temperature that is compatible with the fiber bed filter. The cooling zone includes at least one coolant sprayer adapted to spray a coolant through the emissions as such emissions pass through the cooling zone. The heat exchanger is connected at least indirectly to the coolant sprayer. The heat exchanger is adapted to remove heat from the coolant before the coolant is sprayed through the cooling zone. The coolant recovery mechanism is connected at least indirectly to the heat exchanger. The coolant recovery mechanism is adapted to recover and recirculate through the heat exchanger the coolant after it has been sprayed through the cooling zone. The plate collector sprayer is adapted to spray the plate collector so that at least some of the particulates removed by the plate collector from the emissions are cleaned away from the plate collector. The hot-mix asphalt manufacturing system has dimensions that permit use of conventional trucking to transport the hot-mix asphalt manufacturing system in less than three conventional truck-loads.

The present invention also provides a method of manufacturing hot-mix asphalt. The method comprises the steps of providing a rotary dryer and at least one pollution control device, with dimensions that permit use of conventional trucking to transport the rotary dryer and the pollution control device(s) in less than three conventional truck-loads, feeding primary ingredients of hot-mix asphalt into the rotary dryer, drying the primary ingredients of hot-mix asphalt in the rotary dryer, and treating emissions from the rotary dryer so that hydrocarbons and particulates are substantially removed from the emissions of the rotary dryer before such emissions are released into a surrounding environment of the rotary dryer.

The step of providing the rotary dryer and the pollution control device(s) preferably includes configuring the pollution control device(s) and/or the rotary dryer so that its length is less than or equal to about 53 feet, its height is less than or equal to about 13 feet, 6 inches, and its width is less than or equal to about 8 feet, 6 inches.

Also provided by the present invention is a method of manufacturing hot-mix asphalt, wherein the method comprises the step of providing a rotary dryer that includes 1) a rotatable drum having a first end and an opposite end, 2) an inlet for primary ingredients of hot-mix asphalt, the inlet being located at or near the first end of the rotary dryer, 3) a combustion chamber that is internal to the rotatable drum of the rotary dryer and that is radially spaced apart from an inside circumferential wall of the rotatable drum, to provide a mixing zone between the combustion chamber and the inside circumferential wall, and 4) a heat shield adapted to protect the primary ingredients of hot-mix asphalt from radiant heat developed in the combustion chamber. This method further comprises the steps of 1) introducing primary ingredients of hot-mix asphalt into the rotatable drum, through the inlet, 2) rotating the rotatable drum so that the primary ingredients are conveyed through the rotatable drum toward the opposite end thereof, while combustion gases from the combustion chamber flow substantially from the opposite end of the rotary dryer toward the first end to heat and dry the primary ingredients, and 3) introducing supplemental ingredients into the mixing zone of the rotary dryer so that the supplemental ingredients are mixed with the primary ingredients after the primary ingredients have substantially completed a drying treatment in the rotary dryer.

Preferably, the supplemental ingredients are selected from the group of supplemental ingredients consisting of asphalt cement, rejuvinators, plasticizers, and combinations thereof.

The present invention also provides a method of treating recirculated gases in a hot-mix asphalt manufacturing system. The method comprises the steps of directing recirculated gases from a rotary dryer through a plate collector, and removing particulates from the recirculated gases as the particulates are propelled, by the recirculated gases, into the plate collector.

Also provided is a method of treating emissions from a hot-mix asphalt manufacturing system. The method comprises the steps of directing emissions from a rotary dryer to a fiber bed filter, and substantially removing hydrocarbons and particulates from those emissions at the fiber bed filter before such emissions are released into a surrounding environment of the rotary dryer.

The present invention also provides a method of manufacturing hot-mix asphalt, wherein the method comprises the steps of feeding primary ingredients of hot-mix asphalt into a rotary dryer, drying the primary ingredients of hot-mix asphalt in the rotary dryer, in a counter-flow manner, treating emissions from the rotary dryer by passing the emissions through a-fiber bed filter so that hydrocarbons and particulates are substantially removed from the emissions of the rotary dryer before such emissions are released into a surrounding environment of the rotary dryer, recirculating emissions from the rotary dryer back into a combustion chamber of the rotary dryer, and removing particulates, using a plate collector, from the emissions that are recirculated back into the combustion chamber.

Preferably, the emissions being processed according to any of the foregoing methods or systems are subjected to coalescent filtration and/or Brownian diffusion filtration in a fiber bed filter. In addition, the primary ingredients that are processed in any one of the foregoing systems or according to any one of the foregoing methods can include 100% recycled asphalt product (RAP) or commingled RAP with virgin aggregates.

The above and other objects and advantages will become more readily apparent when reference is made to the following description taken in conjunction with the accompanying drawings.

DESCRIPTION OF PREFERRED EMBODIMENTS

With reference to FIGS. 1–6, a transportable hot-mix asphalt manufacturing system will be described according to a preferred embodiment of the present invention. The hot-mix asphalt manufacturing system comprises a rotary dryer 12 (shown in FIGS. 1–3) and at least one pollution control device 14 (shown in FIGS. 4 and 5).

The rotary dryer 12 is adapted to receive ingredients of hot-mix asphalt and to perform a drying process on such ingredients. Preferably. the rotary dryer 12 is a counter-flow rotary dryer 12. The term "counter-flow" is understood to mean that the materials being dried in the rotary dryer 12 generally flow, or are conveyed, in one direction, whereas the emissions and/or by-products of the drying process flow in an opposite direction.

Figure 1:
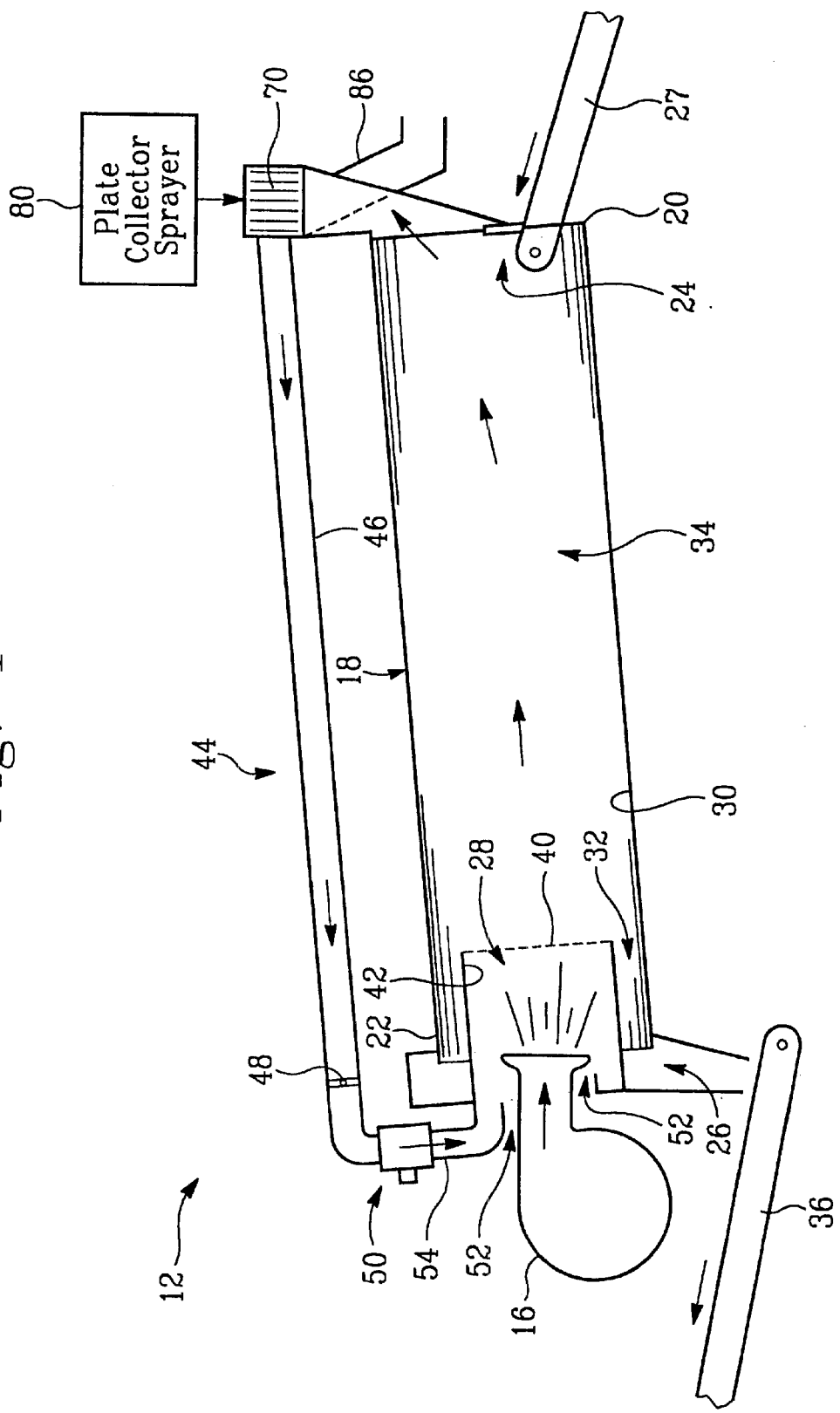
FIG. 1 is a schematic cross-sectional view of a rotary dryer according to a preferred embodiment of the present invention.
Figure 2:
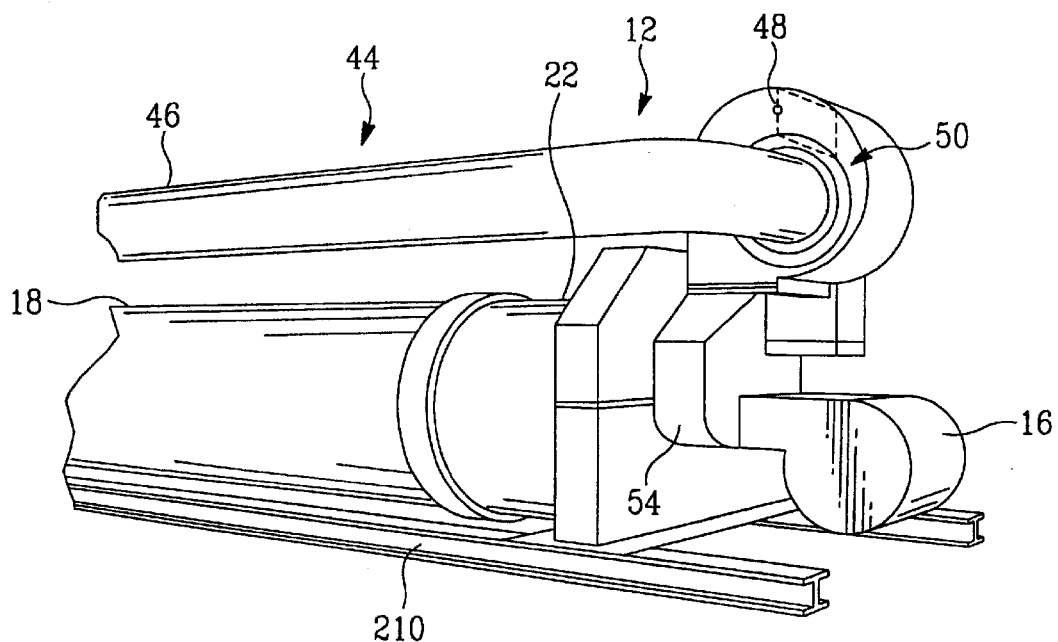
FIG. 2 is a fragmentary perspective view of burner-equipped end of the rotary dryer shown schematically in FIG. 1.
Figure 3:
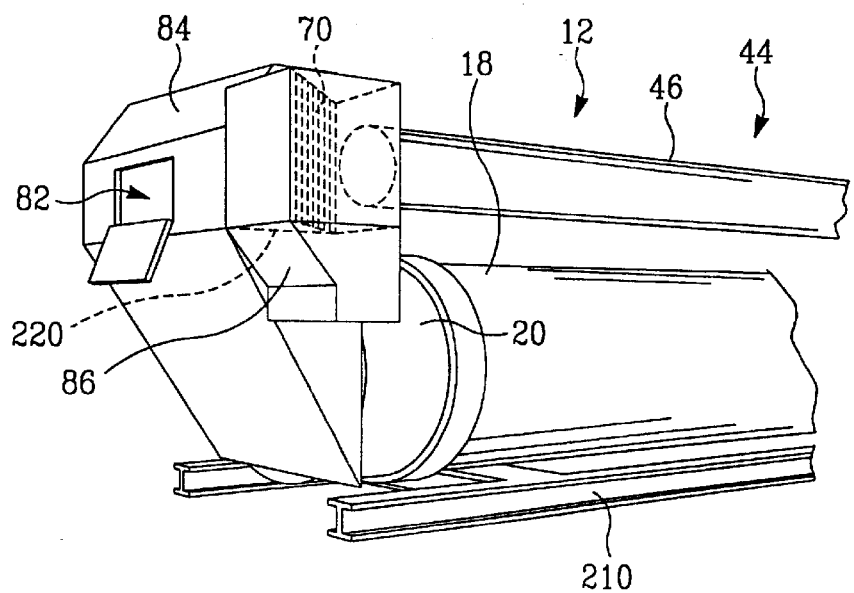
FIG. 3 is a perspective view of the rotary dryer shown in FIG. 2, taken from an end of the rotary dryer opposite to where the burner is located.

The rotary dryer 12 preferably includes a burner 16 and a rotatable drum 18 having a first end 20 and an opposite end 22. The opposite end 22 is shown in FIGS. 1 and 2, whereas the first end 20 is shown in FIGS. 1 and 3.

An inlet 24 for raw or primary ingredients of the hot-mix asphalt preferably is located at or near the first end 20 of the rotatable drum 18. An outlet 26 for the hot-mix asphalt manufactured by the rotary dryer 12 can be located at or near the opposite end 22.

The raw or primary ingredients can be brought to the inlet 24 and introduced into the rotatable drum 28 using a conventional conveyor system 27 (e.g., a belt-type conveyor). The conveyor system 27 is not shown in FIG. 3 so that other structural components of the rotary dryer 12 can be visualized more easily in that drawing.

The rotary dryer 12 preferably includes a combustion chamber 28 in which the burner 16 provides combustion. The combustion chamber 28 preferably is internal to the rotatable drum 18 of the rotary dryer 12 and is radially spaced apart from an inside circumferential wall 30 of the rotatable drum 18. The radial spacing advantageously provides a mixing zone 32 between the combustion chamber 28 and the inside circumferential wall 30. Supplemental ingredients (or additives) can be introduced into the mixing zone 32 of the rotary dryer 12 so that the supplemental ingredients are mixed with the primary ingredients after the primary ingredients have substantially completed a drying treatment in a drying zone 34 of the rotary dryer 12. The supplemental ingredients, for example, can include asphalt cement, rejuvinators, plasticizers, and/or combinations thereof.

Since the tubular walls 42 of the combustion chamber 28 remain stationary (i.e., they do not rotate with the drum 18), plumbing (not shown) for the supplemental ingredients can be provided through or along the wall 42 of the combustion chamber 28. Pumps and metering equipment for the supplemental ingredients can be located outside of the rotary drum 18 and can be connected to an external plumbing connection. A nozzle directed toward the mixing zone 32 can be mounted at the internal end of the plumbing, to expel the supplemental ingredients into the mixing zone 32. Using such an arrangement, the supplemental ingredients can be metered outside of the rotatable drum 18, can be pumped into the plumbing, and can be expelled into the mixing zone 32 by the nozzle.

Downstream (with respect to ingredient flow) of the mixing zone 32, the hot-mix asphalt manufactured by the rotary dryer 12 is allowed to drop through the outlet 26 and onto a hot-mix conveyor system 36. In FIG. 2, the hot-mix conveyor system 36 is not shown so that other structural components of the rotary dryer 12 can be visualized more easily in that drawing.

Since the combustion chamber 28 is internal to the rotatable drum 18, its length contributes little, if anything, to the overall length of the rotary dryer 12. This advantageously allows the rotary dryer 12 to be provided in a more compact structure than might otherwise be possible.

A heat shield 40 can be provided to protect contents of the rotary dryer 12 from radiant heat produced in the combustion chamber 28. The heat shield 40 and the tubular walls 42 of the combustion chamber 28 preferably are made of stainless steel (e.g., alloy 309).

In operation, the raw or primary ingredients of the hot-mix asphalt are received through the inlet 24 for passage through the rotatable drum 18 toward the opposite end 22. At the same time, combustion gases from the combustion chamber 28 flow substantially from the opposite end 22 of the rotary dryer 12 toward the first end 20 to heat and dry said raw ingredients.

The counter-flow rotary dryer 12 preferably is adapted to manufacture hot-mix asphalt when the primary (or raw) ingredients received through the inlet 24 include 100% recycled asphalt products (RAP), or virgin aggregates commingled with recycled asphalt products (RAP). Use of such primary ingredients is facilitated by keeping the flame in the combustion chamber 28 from impinging upon the primary ingredients (e.g., by providing the combustion chamber 28 with walls 42 and the heat shield 40).

The system preferably includes a recirculator 44. The recirculator 44 is adapted to recirculate emissions (or combustion gases) from the first end 20 of the rotary dryer 12 back into the combustion chamber 28, preferably, at or near the opposite end 22. The recirculator 44 includes a recirculator duct 46 extending from the first end 20 of the rotary dryer 12 to the opposite end 22. A damper 48 and recirculation fan 50 are located along the recirculator duct 46. The damper can be located anywhere along the length of the recirculator duct 46, or alternatively, as shown in FIG. 2, can be located at the intake of the fan 50. The recirculation fan 50 draws emissions from the first end 20 of the rotary dryer 12 into the recirculator duct 46 and pushes such emissions into the combustion chamber 28. The orientation of the damper 48 can be modulated to provide a desired volume of flow through the recirculation duct 46. The recirculated emissions (or combustion gases) can be mixed and appropriately proportioned with ambient air that is drawn into the combustion chamber 28 via intakes 52, to achieve efficient combustion in the combustion chamber 28.

Figure 6:
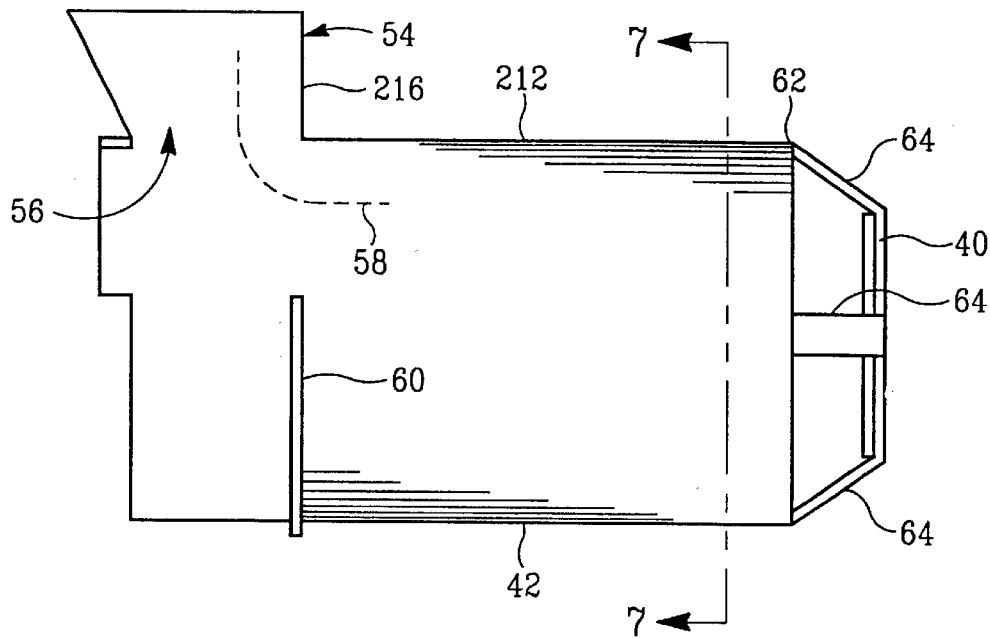
FIG. 6 is a side view of a combustion chamber of the rotary dryer shown in FIGS. 1–3, according to a preferred embodiment of the present invention.
Figure 7:
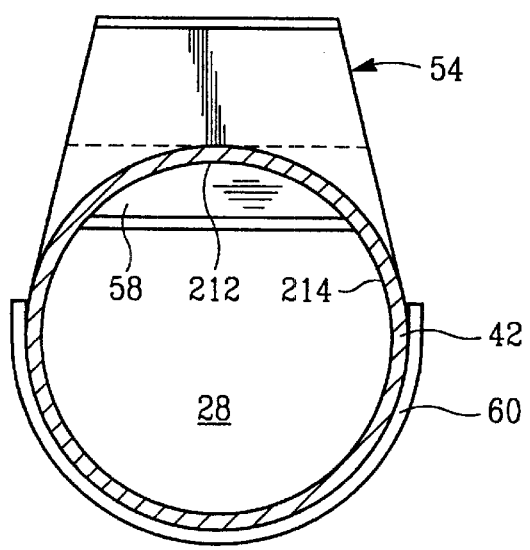
FIG. 7 is a cross-sectional view of the combustion chamber shown in FIG. 6, taken along line XII—XII in FIG. 6.

FIG. 6 is a side view of the combustion chamber 28 according to a preferred embodiment of the present invention. FIG. 7 is a cross-sectional view taken along line XII—XII in FIG. 6. Connected between the recirculation duct 46 (or the recirculation fan 50) and the combustion chamber 28 is a recirculation transition duct 54. The recirculation transition duct 54 provides a flow size adjustment from the size of the recirculation duct 46 or fan 50 to the size of the recirculation entrance 56 to the combustion chamber 28.

A deflector plate 58 can be mounted so that it extends from the recirculation transition duct 54 into the combustion chamber 28. The deflector plate 58 serves to redirect the flow of emissions toward the combustion chamber 28 from the recirculation transition duct 54. A flange 60 is provided at least partially around the exterior of the walls 42 of the combustion chamber 28. The flange 60 facilitates mounting and positioning of the combustion chamber 28 to the rotary dryer 12.

The recirculation transition duct 54, the flange 60, and any portion of the combustion chamber that extends to the left of the flange 60 in FIG. 6 preferably are mounted outside of the rotatable drum 18. Since these components do not engage the ingredients in the rotatable drum 18, they can be made of mild steel, instead of stainless steel.

As illustrated in FIG. 6, the shield 40 preferably is secured to the end 62 of the tubular walls 42 by several tabs 64 (two of which are shown in FIG. 6). The tabs 64 extend radially inwardly from the walls 42 and forward (toward the first end 20) as well. Preferably, the tabs 64 are arranged so that the heat shield 40 is about 10 inches forward of the end 62 of the tubular walls 42.

Figure 8:
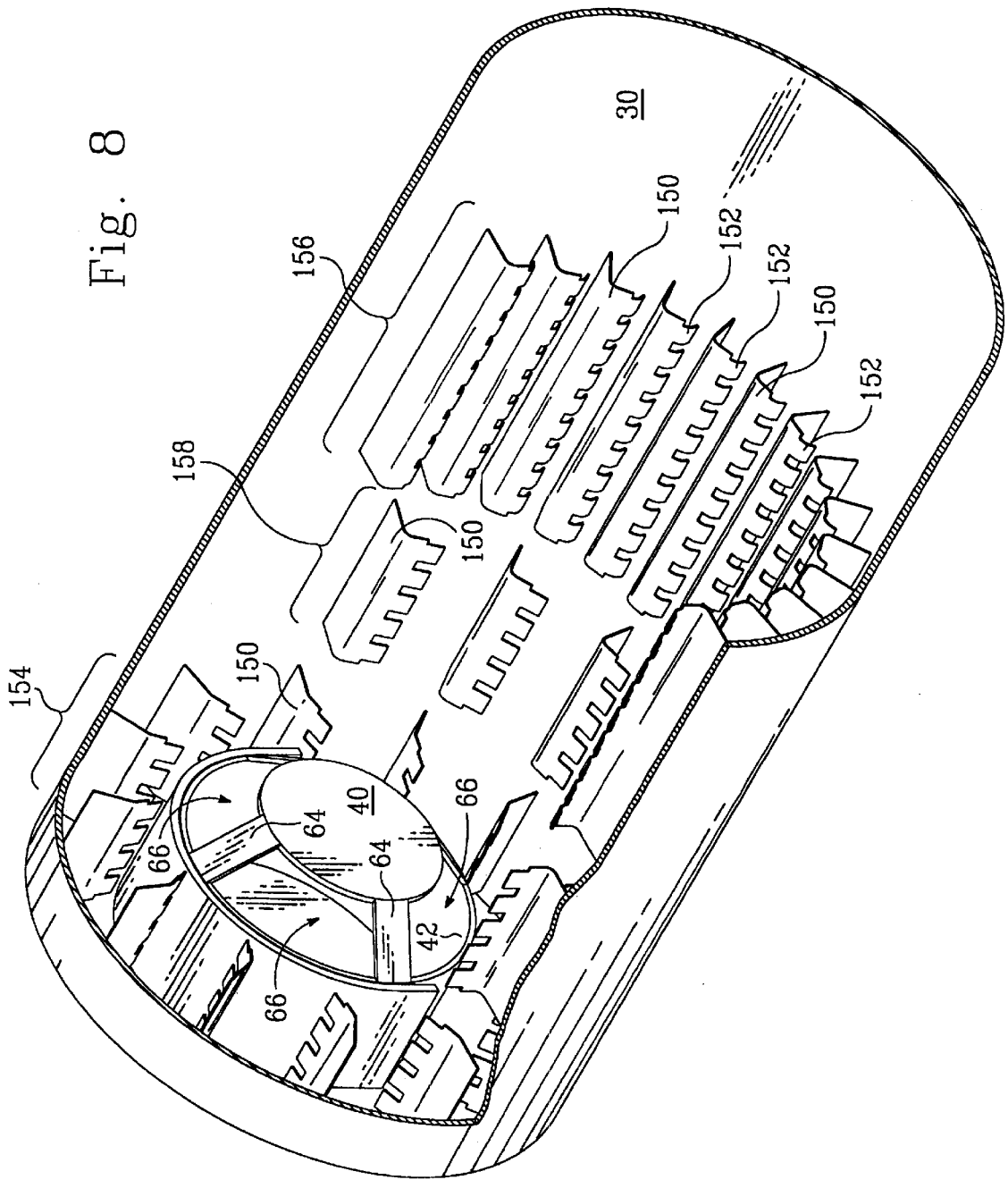
FIG. 8 is a fragmentary perspective view of a drum of the rotary dryer shown in FIGS. 1–3, wherein the wall of the drum is partially omitted from the view to show an arrangement of flights in the drum, according to a preferred embodiment of the present invention.

FIG. 8 is a fragmentary perspective view of the drum 18 of the rotary dryer 12, wherein the wall 30 of the drum 18 is partially omitted from the view to show the interior of the drum 18. As shown in FIG. 8, the tabs 64 preferably are spaced apart from one another to define openings 66 between the shield 40 and the walls 42. These openings 66 allow the combustion gases generated in the combustion chamber 28 to flow out from the combustion chamber 28 and into the drying zone 34 of the rotary dryer 12.

The recirculation provided by the recirculator 44 has the beneficial effect of cooling the byproducts of combustion without significantly decreasing the rotary dryer's overall efficiency. Preferably, the damper 48 is modulated so that the combustion gases exiting the combustion chamber 28 are at a temperature of about 1,000 to 1,200 degrees F. and the rest of the rotary dryer 12 is configured and operated so that the hot-mix asphalt exiting the mixing zone 32 through the outlet 26 has a temperature of about 300 degrees F. An exemplary flow rate of the emissions through the recirculation duct 44 is about 10,000 actual cubic feet per minute (A.C.F.M.).

As illustrated in FIG. 1, a plate collector 70 can be provided at the recirculator 44. The plate collector 70 can be provided as part of, in association with, or separate from, the pollution control device 14. The plate collector 70 is adapted to remove particulates from emissions (or combustion gases) that are recirculated into the combustion chamber 28 by the recirculator 44. The plate collector 70 preferably removes from the emissions (or combustion gases) that are being recirculated by the recirculator 44, at least about 90% of the particulates suspended in such emissions (or combustion gases).

Figure 9:
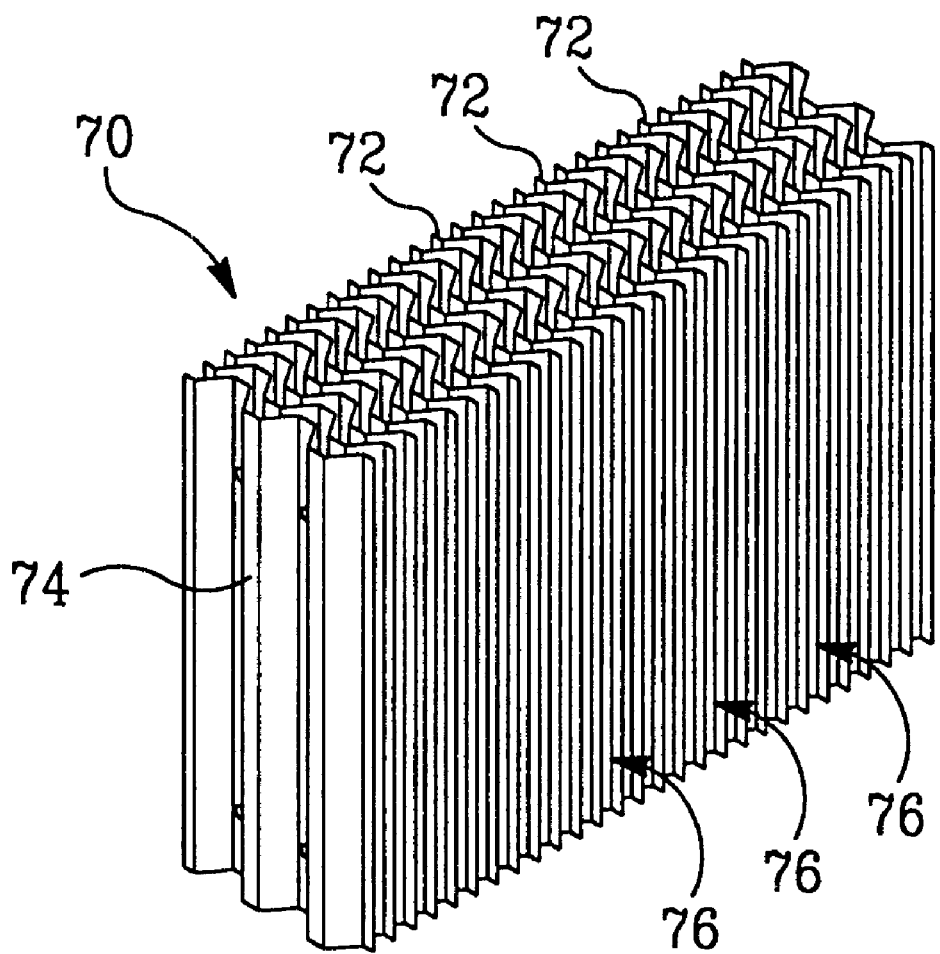
FIG. 9 is a perspective view of a plate collector in the rotary dryer shown in FIGS. 1–3, according to a preferred embodiment of the present invention.

As shown in FIG. 9, a plate collector 70 can be configured from plates 72 that are commercially available, for example, from Otto York. Each plate 72 in a plate collector 70 has major surfaces 74 that undulate. The plates 72 are spaced from one another such that an undulating flow path 76 is created between each pair of the plates 72. Emissions flowing between the plates 72 must follow the undulating paths 76. Particulates in the emissions, however, tend to collide with, and collect on, the undulating surfaces 74 of the plates 72, rather than follow the entire undulating flow paths 76.

As shown schematically in FIG. 1, a plate collector sprayer 80 can be provided to spray the plate collector 70 so that at least some of the particulates removed by the plate collector 70 from the emissions (or combustion gases) are cleaned away from the plate collector 70. Preferably, the plate collector sprayer 80 is adapted to spray water on the plate collector 70 so that the water strikes the particulates and falls away from the plate collector 70, carrying at least some of the particulates away from the plate collector 70. While the plate collector sprayer 80 can be mounted to the rotary dryer 12, it is understood that it need not be fixed permanently to the dryer 12. An access hatch 82, for example, can be provided near the plate collector 70, as shown in FIG. 3. Whenever it is desirable or necessary to spray the plate collector 70 using an independent sprayer, access can be gained through the access hatch 82.

Figure 10:
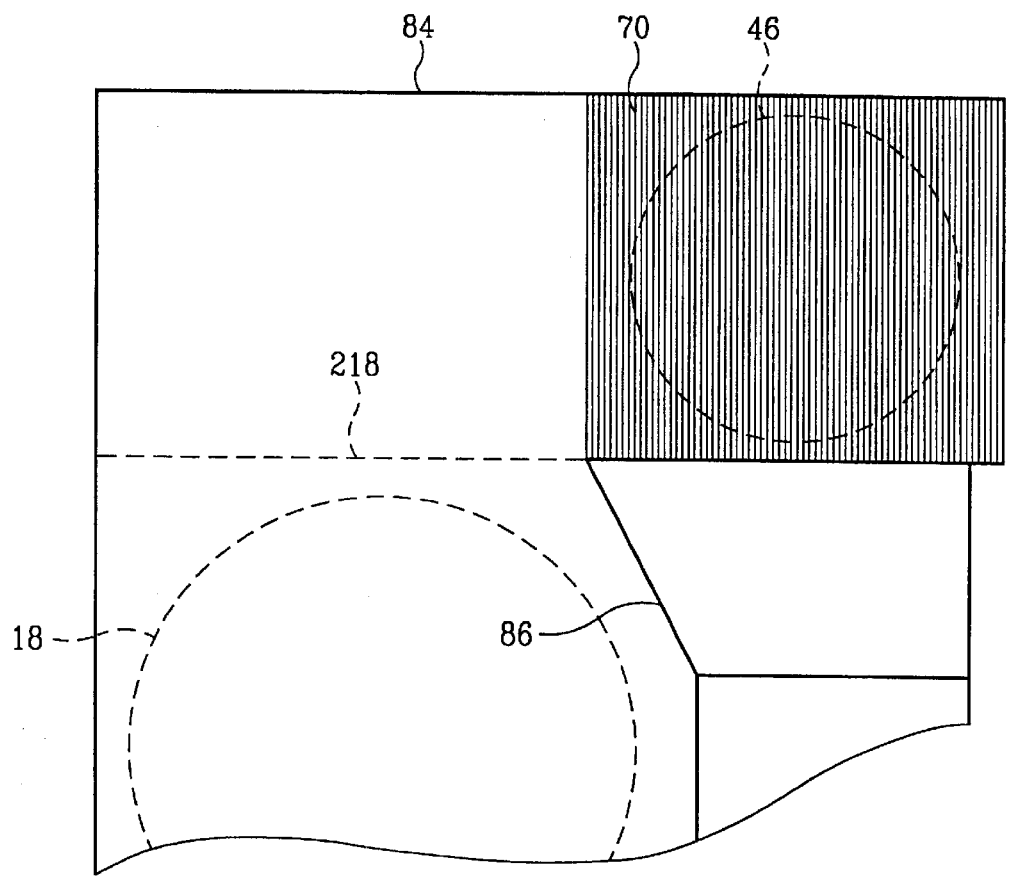
FIG. 10 is a fragmentary elevation view of a rotary dryer exhaust duct that houses the plate collector shown in FIG. 9, according to a preferred embodiment of the present invention.
Figure 11:
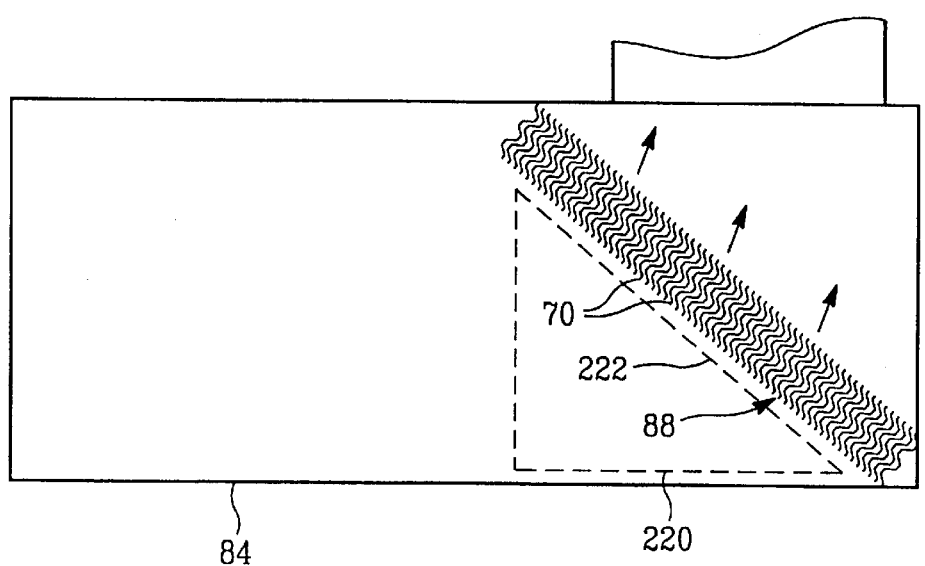
FIG. 11 is a fragmentary plan (or top) view of the rotary dryer exhaust duct shown in FIG. 10.

As illustrated in the perspective view of FIG. 3, the fragmentary elevation of FIG. 10, and the fragmentary top view of FIG. 11, the plate collector 70 preferably receives the emissions from the rotary dryer 12 via a rotary dryer exhaust duct 84. The rotary dryer exhaust duct 84 is connected between the first end 20 of the rotary dryer 12 and the plate collector 70. Not all of the emissions from the rotary dryer 12 are recirculated by the recirculation duct 46. The excess emissions at the first end 20 of the rotary dryer 12 (i.e., the emissions in excess of what is to be recirculated) are directed into a pollution control duct 86 by the rotary dryer exhaust duct 84. The pollution control duct 86 is connected between the entrance 88 to the plate collector 70 and the aforementioned pollution control device(s) 14. The excess emissions therefore are treated by the pollution control device(s) 14.

Figure 4:
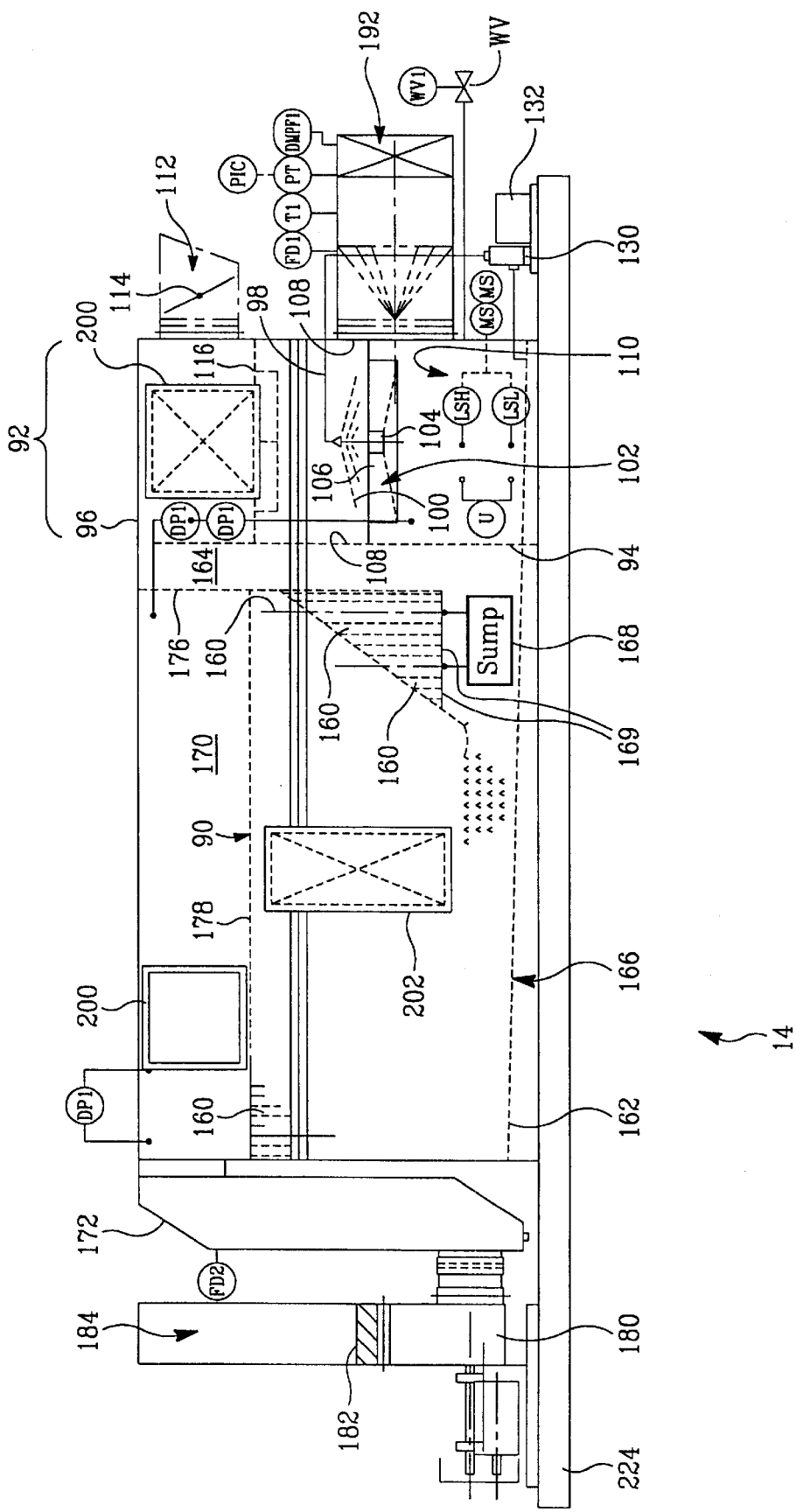
FIG. 4 is a side elevation view of a pollution control device according to a preferred embodiment of the present invention.
Figure 5:
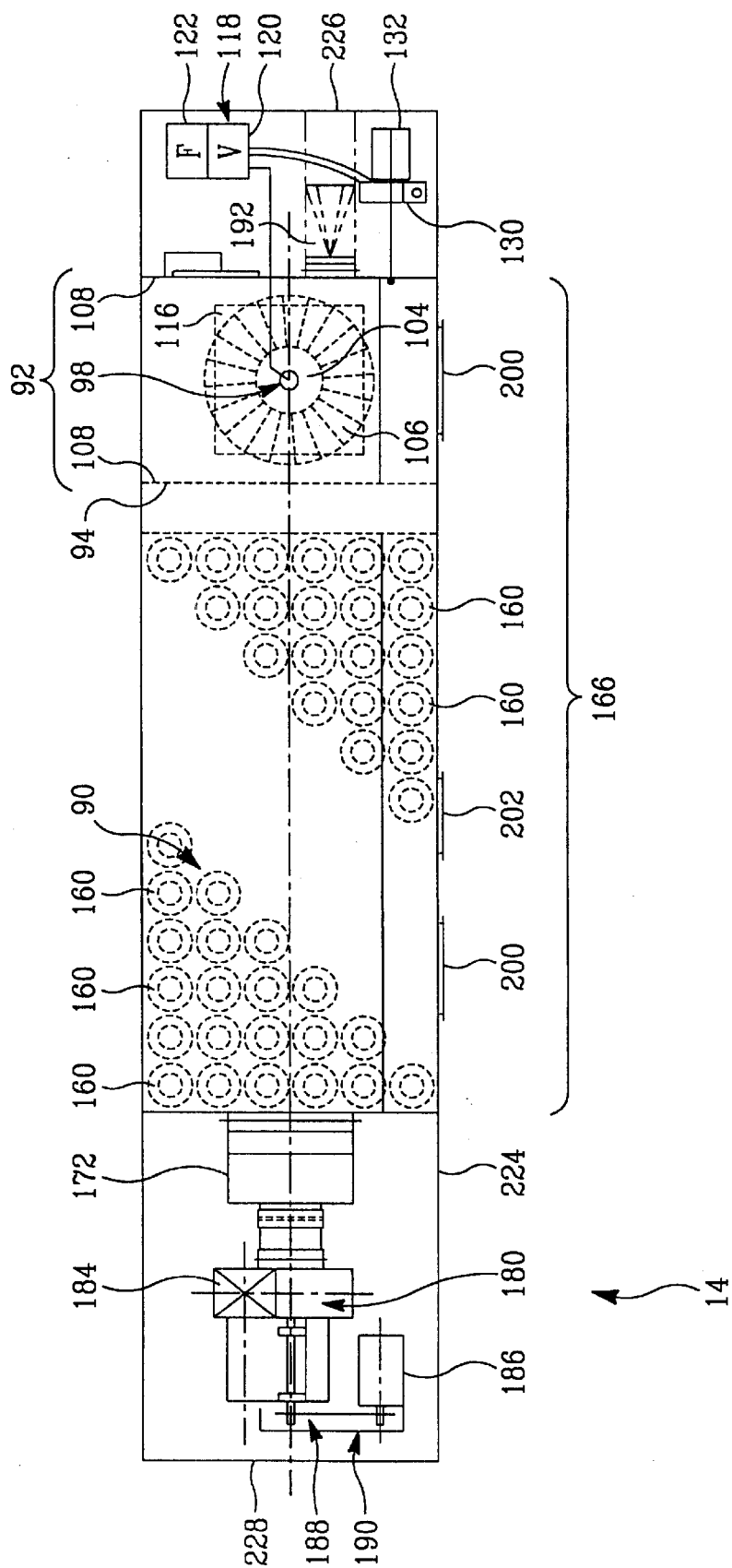
FIG. 5 is a plan view of the pollution control device shown in FIG. 4.

With reference to FIGS. 4 and 5, the pollution control device(s) 14 is (are) adapted to treat emissions from the rotary dryer 12 so that hydrocarbons and particulates are substantially removed from the emissions of the rotary dryer 12 before such emissions are released into a surrounding environment of the rotary dryer 12. Hereinafter, the pollution control device(s) 14 will be referred to in singular form, though it is understood that more than one such device 14 can be provided.

Preferably, the pollution control device 14 includes a fiber bed filter 90. The fiber bed filter 90 preferably is configured to provide coalescent filtration of emissions from the rotary dryer 12. The coalescent filtration preferably is achieved by subjecting the emissions from the rotary dryer 12 to Brownian diffusion filtration. Fiber bed filters suitable for use in the exemplary pollution control device 14 shown in FIGS. 4 and 5 are commercially available, for example, from Advanced Environmental Systems.

The pollution control device 14 preferably includes a cooling zone 92 adapted to cool the emissions from the rotary dryer 12 enough that such emissions achieve a temperature that is compatible with the fiber bed filter 90. A partition 94 separates the cooling zone 92 from the fiber bed filter 90. The partition 94, however, stops short of the top 96 of the pollution control device 14 so that emissions treated in the cooling zone 92 can enter the fiber bed filter 90 through an opening between the partition 94 and the top 96.

The cooling zone 92 preferably includes at least one coolant sprayer 98 adapted to spray a coolant 100 into the emissions as such emissions pass through the cooling zone 92. The spray of coolant 100 advantageously reduces the temperature of the emissions and causes the majority of the remaining uncondensed hydrocarbons to become condensed. The spray of coolant 100 also encourages coalescing of the submicron particulates to begin.

The cooling zone 92 can be provided with a cyclonic plate 102 adapted to induce a cyclonic flow of the emissions in the cooling zone 92. The cyclonic plate 102 can include a central hub 104 and a plurality of blades 106 that extend radially out from the hub 104. The blades 106 preferably are angled so as to induce the desired cyclonic flow of the emissions in the cooling zone 92. The cyclonic flow in the cooling zone 92 provides aggressive contact between the emissions and the coolant 100. This, in turn, tends to enhance exposure of the emissions to the coolant spray and thereby enhances the cooling and condensation effects provided thereby. It also enhances the likelihood that particulates in the emissions will engage coolant droplets and/or the wet walls 108 of the cooling zone 92, and that such particulates will coalesce and fall with the coolant droplets or with the flow of coolant along the walls 108 of the cooling zone 92, into a coolant recovery mechanism 110 to be described hereinafter.

The cooling zone 92 also can include an air introduction port 112 through which air cooler than the emissions is introduced into the emissions after the cooling zone 92 to further cool and/or dilute the emissions prior to entering the fiber bed filter 90. Preferably, a dilution air damper 114 is provided in the air introduction port 112. The dilution air damper 114 can be selectively opened and closed to regulate the flow of air through the introduction port 112. This, in turn, can be used to ensure that enough ambient air enters the flow of emissions to ensure that the temperature of the emissions reaching the fiber bed filter 90 remains within acceptable limits (e.g., at about 120 degrees F). The dilution air damper 114 in this regard can be controlled in response to a temperature signal from a temperature sensor, such as a thermocouple located in the stream of emissions flowing into the fiber bed filter 90.

Inasmuch as some larger particulates (above the submicron range of sizes) may pass through the coolant spray without becoming engaged to a coolant droplet and some droplets may be swept up in the flow of emissions, a pre-filter 116 can be located between the coolant spray and the fiber bed filter 90, preferably between the coolant spray and the air introduction port 112. To avoid the expense of filter replacement, the pre-filter 116 can be provided in the form of a washable plate collector 116. Since the washable plate collector 116 is capable of stopping the coarse, sticky particulates and coolant droplets, a de-misting function is served by the pre-filter 116 and the surface loading of the fiber bed filters 90 is advantageously reduced. This reduction in surface loading advantageously translates into a longer fiber bed filter life.

Preferably, the coolant sprayer(s) 98 is connected to a heat exchanger 118 (shown in FIG. 5). The heat exchanger 118 is adapted to remove heat from the coolant 100 before the coolant 100 is sprayed through the cooling zone 92. This can be done by feeding the coolant 100 through a radiator-like vessel 120 with heat dissipating fins, while ambient air is passed over the vessel 120 or through openings in the vessel 120. Preferably, a heat exchanger 118 is provided with a fan 122 that forces air over the surface of the vessel 120 and through any openings in the vessel 120. Heat from the coolant 100 thereby is transferred to the ambient air and is dissipated into the surrounding environment. The coolant 100 then exits the vessel 120 at a lower temperature than when it entered.

The heat exchanger 118 can be connected to the coolant recovery mechanism (or sump) 110 which is adapted to recover the coolant 100 after it has been sprayed through the cooling zone 92 and recirculate the coolant 100 through the heat exchanger 118. The coolant recovery mechanism 110 preferably includes a recirculation pump 130. and a motor 132 that drives the recirculation pump 130.

Figure 12:
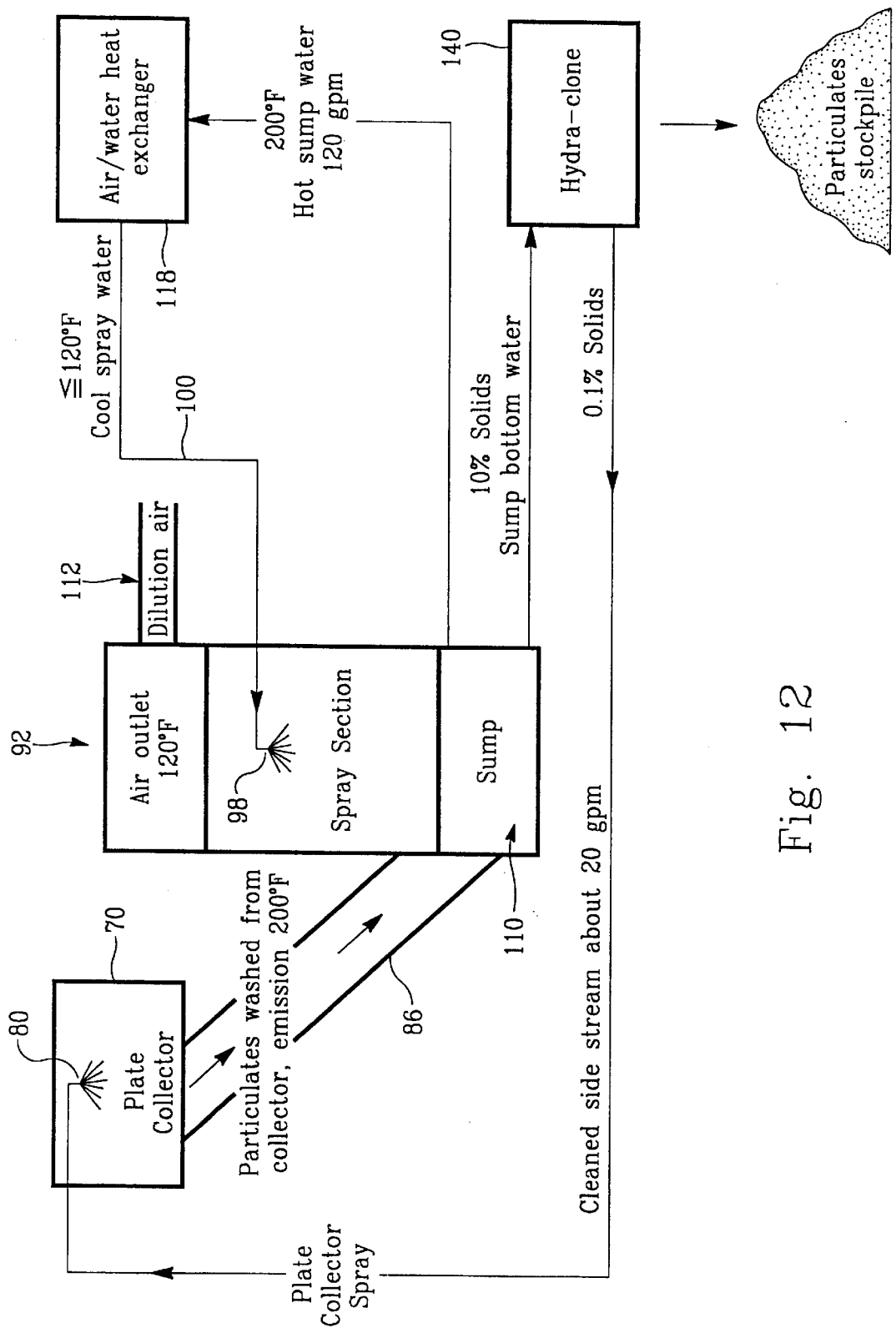
FIG. 12 is a block diagram of a coolant circuit according to a preferred embodiment of the present invention.

Preferably, as shown in FIG. 12, this same coolant recovery mechanism (or sump) 110 is fluidly connected at least indirectly to the plate collector sprayer 80 so that the coolant 100 used in the cooling zone 92 also is supplied to the plate collector sprayer 80 and is sprayed by the plate collector sprayer 80 to clean particulates away from the plate collector 70. The coolant 100 preferably is water. Other coolants, however, can be used. Preferably, the coolant recovery mechanism (or sump) 110 also recovers and recirculates the coolant (or water) 100 that the plate collector sprayer 80 sprays onto the plate collector 70. Since the washable plate collector 116 that can be used as the pre-filter 116 is located above the coolant sprayer 98, the run-off from washing of the washable plate collector 116 also can be collected by the coolant recovery mechanism (or sump) 110. In this regard, washing of the washable plate collector 116 can be performed using the same coolant (e.g., water) 100 that is used by the coolant sprayer 98.

Generally, recovery and recirculation of the coolant 100 is desirable because it minimizes coolant (e.g., water) consumption. As the coolant (e.g., water) 100 evaporates, it can be added automatically by a suitable coolant (e.g., water) level-responsive re-fill valve WV.

Depending on local regulations, there may be no need to recover the coolant 100. In some cases, for example, it may be legal and practical to dispose of the particulate-containing coolant 100 in a sewer or wastewater treatment facility.

Since the coolant (e.g., water) 100 carries particulates away from the cooling zone 92, from the plate collector 70 and/or from the washable pre-filtering plate collector 116, a particulate removal device 140 can be connected at least indirectly to the coolant recovery system 110. The particulate removal device 140 removes particulates entrained in the coolant 100 from the coolant 100 prior to the coolant 100 being sprayed by the plate collector sprayer 80 and/or by the coolant sprayer 98.

A hydra clone 140 can be used as the particulate removal device 140. Other particulate removal devices and/or techniques, however, can be used. The particulates that are removed by the particulate removal device 140 can be discarded or alternatively can be fed back to the rotary dryer 12. As illustrated in FIG. 12, the particulates can be stored in a stockpile at the output from the hydraclone.

Preferably, as illustrated in FIG. 8, the inside walls 30 (which are partially omitted in this view) of the drum 18 are provided with numerous flights 150 of teeth 152. Notably, in the exemplary embodiment of FIG. 8, three sections of flights 150 are provided. One section 154 is located for rotation through the mixing zone 32. A second section 156 is located in the drying zone 34, far from the mixing zone 32. Located between the first and second sections 154,156, is the third section 158 of flights 150.

Preferably, the spacing between the flights 150 in the first and third sections 154,158 is larger than the spacing between the flights 150 in the second section 156. In addition, the teeth 152 of each section can be bent toward the walls 30. In the exemplary embodiment shown in FIG. 8, the teeth 152 of each flight 150 in the second section 156 are bent closer toward the walls 30 of the drum 18 than the teeth 152 in the first and third sections 154,158. Likewise, the teeth 152 of each flight 150 in the third section 158 are bent closer toward the walls 30 of the drum 18 than the teeth 152 in the first section 154. The differences between the teeth 152 and flight 150 arrangements in the different sections 154,156,158 are consistent with providing more of a lifting-and-dropping action in the drying zone 34 and more of a tumbling action in the mixing zone 32.

Preferably, the rotary dryer 12 is rotated at a sufficient speed to provide aggressive veiling of the primary ingredients in the rotary dryer 12 (i.e., aggressive lifting and dropping of the ingredients so that they are spread out and exposed aggressively to the combustion gases). When this aggressive veiling is combined with the counter-flow operation of the rotary dryer 12 and the recirculation of emissions provided by the recirculator 44. the resulting hot-mix manufacturing system produces emissions that advantageously have a relatively low exhaust gas temperature. The exemplary configuration shown in FIGS. 1–12 and described above, for example, can be configured and operated so that the emissions exit the rotary dryer 12 at a temperature of about 200 to 212 degrees F.

Such a reduction in emission temperatures provides two primary benefits. The first benefit is a reduction in the amount of energy (or heat) lost through the emissions. This, in turn, enhances the overall efficiency of the hot-mix asphalt manufacturing system. It also brings the emission temperatures closer to the temperatures that are compatible with existing cost-effective and practical fiber bed filters, especially those that effectively remove the particulates and/or hydrocarbons using coalescent filtration and/or Brownian diffusion filtration. The lower exit temperature makes it far more practical to further cool (using the aforementioned coolant spray and/or introduction of ambient air through the air introduction port 112) the emissions to temperatures (e.g., about 120 degrees F.) that are compatible with the exemplary fiber bed filter 90 described above.

A second benefit is that the hydrocarbon compounds that evaporate off from the asphalt cement-coated primary ingredients in the hotter zones of the dryer 12 begin to condense as they exit the rotary dryer 12. These hydrocarbons are relatively long-chain hydrocarbons and condense out from the emissions at temperatures above 120 degrees F. Many such hydrocarbons will condense out in the rotary dryer 12 to form an aerosol in the emissions. The condensation of hydrocarbons makes their removal from the emissions more practical because they can be removed using the aforementioned coalescent fiber bed filters 90. In particular, the aerosol strikes the fiber bed filter 90 and coalesces thereon. As coalescing continues, the collection of hydrocarbons becomes enough to overcome surface tension and the coalesced hydrocarbons drop from the fiber bed filter 90 for collection and disposal.

With reference to FIGS. 4 and 5, the fiber bed filter 90 can be defined by a plurality of fiber bed filter tubes 160. Preferably, the filter tubes 160 are arranged vertically and substantially parallel to one another. Each filter tube 160 is made of densely packed fiber bed filter material capable of coalescing submicron aerosol. The exterior of each filter tube 160 is exposed to the incoming cooled and/or diluted emissions from the cooling zone 92. As coalescing of the aerosol continues, the coalesced aerosol begins to drop from the tubes 160 onto a floor 162 of the intake portion 164 of the filter bed housing 166. Notably, the floor 162 is slanted toward a filter bed sump 168 so that the run-off from the fiber bed filter 90 can be collected and appropriately treated and/or discarded. Generally, it is desirable to treat the run-off from the fiber bed filter 90 separately from the coolant (e.g., water) 100 because of its high content of hydrocarbons. Alternatively, the floor 162 can be slanted toward the coolant recovery mechanism 110 so that the run-off from the fiber bed filter 90 is collected and processed along with the recovered coolant (e.g., water) 100.

The inside of each fiber bed filter tube 160 has a closed bottom end 169 and is fluidly connected to a clean air exhaust chamber 170 of the fiber bed filter 90. The clean air exhaust chamber 170, in turn, is connected to a clean air exhaust duct 172. The emissions therefore are filtered by passing through the walls of the tubes 160, from an outside surface of a tube 160 to the inside surface thereof. The filtered emissions then flow through the inside of the tube(s) 160 toward the clean air exhaust chamber 170 and then into the clean air exhaust duct 172.

A clean/dirty partition 176 separates the clean air exhaust chamber 170 from the intake portion 164 of the housing 166. The clean/dirty partition 176 has a horizontal portion 178 that has holes aligned with the insides of the tubes 160, so that the insides of the tubes 160 fluidly communicate with the clean air exhaust chamber 170.

A filter fan 180 and filter damper 182 can be provided at the fiber bed filter 90 to induce and control, respectively, the flow of emissions through the fiber bed filter 90. The clean air from the clean air exhaust duct 172 is drawn into the fan 180 and expelled through an exhaust stack 184. The fan 180 can be driven directly by a motor 186, or alternatively, as shown in FIGS. 4 and 5, can be driven by a belt/pulley arrangement 188 that, in turn, is driven by the motor 186. Preferably, a belt guard 190 is provided at least partially around the belt/pulley arrangement 188.

The motor 186 that turns the filter fan 180 can be operated at a relatively constant frequency level, and the damper 182 can be modulated to control the flow rate of emissions through the fiber bed filter 90. This arrangement has the advantage that the fan 180 requires no complex control and/or drive circuitry. The fan 180 simply operates at a relatively constant speed, with the damper 182 providing the desired control in flow rate.

Generally, the filtration efficiency of the fiber bed filter 90 remains constant as the filter 90 becomes fouled. The pressure difference required across the filter 90 to maintain the same flow rate, however, increases as the filter 90 becomes fouled. The filter 90 typically remains useful until the requisite difference in pressure across the filter 90 increases beyond the capabilities of the fan 180 or its motor 186. When the requisite difference in pressure exceeds the capabilities of the fan 180 and/or motor 186, the filter tubes 160 can be replaced.

In embodiments that have a damper 182 and fan 180 arrangement, the relatively constant flow rate of emissions through the fiber bed filter 90 is maintained by keeping the damper 182 only slightly open when the filter 90 is new and by gradually moving the damper 182 toward a fully open position as the pressure difference across the filter 90 increases with fouling of the filter 90 over a long period of time.

Alternatively, compensation for the increasing difference in pressure required across the filter 90 can be provided without the damper 182, by providing an adjustable-speed filter fan 180 and/or motor 186. A variable frequency fan drive, for example, can be connected to the filter fan 180 or motor 186. The variable frequency fan drive modulates the speed of the fan motor 186 to compensate for increases in the required pressure difference across the filter 90. The fan 90, in this regard, can be driven at a faster rate as the filter 90 becomes fouled.

While arrangements with the adjustable-speed fan 180 may be more expensive to initially implement than the damper 182/fan 180 arrangements (e.g., because they require variable frequency fan drive or some other mechanism for driving the fan 180 in such a way that the pressure difference across the filter 90 increases), it will be to appreciated that the power requirements of the fan 180, over time, are significantly reduced. The reductions in power requirements are realized because the fan 180 can be slowed down when the filter 90 is new or relatively unfouled, and have its power requirements increased only as needed to compensate for fouling of the filter 90.

Regardless of whether the pollution control device 14 is implemented with a damper 182/fan 180 arrangement, an arrangement with an adjustable-speed fan, or a combination of both, it will be appreciated that the speed and/or damper 182 can be modulated (automatically or manually) in response to a signal from a pressure transducer PT located between the cooling zone 92 and the fiber bed filter 90 or located at the intake 192 to the pollution control device 14. The signal from the pressure transducer PT indicates the intake pressure of the fiber bed filter 90 or pollution control device 14, and therefore also provides a relatively accurate indication of the rate at which emissions are being drawn through the fiber-bed filter 90.

Alternatively, the speed and/or damper 182 can be modulated (automatically or manually) by a signal from a pressure sensor at the mixing zone 32 of the rotary dryer 12. The signal from the pressure sensor at the mixing zone 32 can be used to gradually open the damper 182 as the pressure detected in the mixing zone 32 increases beyond a predetermined desired negative pressure, toward ambient pressure. By contrast, the damper 182 is gradually closed if the pressure in the mixing zone 32 becomes more negative than the predetermined desired negative pressure, according to the signal from the pressure sensor. The rate at which emissions are drawn through the rotary dryer 12 therefore can be controlled by suitably controlling the damper 182 and/or fan 180 speed in response to the pressure in the mixing zone 32.

When it is practical to reduce the flow rate of emissions, a longer fiber bed filter life can be provided by partially closing the damper 182 and/or by reducing the speed of the fan 180. This, in turn, decreases the flow of emissions through the fiber bed filter 90 and increases the life of the filter tubes 90. The time between maintenance and/or replacement of the filter 90 therefore can be expanded by reducing the flow rate of emissions. An advantage of the fiber bed filters 90 is that such reductions in flow rate have no negative impact on the filtering efficiency.

Preferably, the pollution control device 14 and the rotary dryer have dimensions that permit use of conventional trucking to transport the rotary dryer 12 and the pollution control device 14 in less than three conventional truck-loads. The pollution control device 14 and/or the rotary dryer 12, in this regard, preferably are configurable so that each has a length that is less than or equal to about 53 feet, a height that is less than or equal to about 13 feet, 6 inches, and a width that is less than or equal to about 8 feet, 6 inches. The rotary dryer 12 therefore can be transported conveniently using conventional trucking to a site where the hot-mix asphalt is needed, as can the exemplary pollution control device 14. An additional truck load can be used to transport a supply facility to the same site. The supply facility can include, for example, a source of power (e.g., an electric generator), a source of fuel, and/or a source of supplemental ingredients for the rotary dryer 12 and its associated pollution control device 14. Since there is no need to significantly disassemble the pollution control device 14 before it is transported, the process of putting the hot-mix manufacturing system in operation is relatively easy. It primarily involves connecting the supply facility components to the rotary dryer 12 and the ducts 86 from the rotary dryer 12 to the pollution control device 14. and making other minor connections for power, signal transmission, and fuel and/or water supply.

The foregoing hot-mix asphalt manufacturing system therefore makes it much more practical and inexpensive to set up a hot-mix asphalt manufacturing facility at a remote site where the hot-mix asphalt is needed. Notably, the transportable hot-mix asphalt manufacturing system is not limited to use with virgin aggregates. It can process 100% RAP, as well as commingled RAP and virgin aggregates. This represents a significant advance over conventional hot-mix asphalt manufacturing systems. According to the present invention, it is now possible to provide a hot-mix manufacturing service according to which the manufacturing facility is brought to the site where the asphalt is needed or to a site where the raw materials are located. Significant savings in labor and transportation costs can be realized by such a system. The manufacturing service according to the present invention also can include operator services, whereby trained operators of the system are dispatched with the system to the site where hot-mix asphalt is to be manufactured.

Alternatively, the truck loads that make up the rotary dryer 12, pollution control device 14, and/or supply facility can be leased or rented, and then located at the site where they are needed. A trained operator of the customer then would operate the system.

Using the foregoing hot-mix asphalt manufacturing system, a plant capable of producing 800 tons per day of hot-mix asphalt for lay down or patching can be set up virtually anywhere such a plant is desired. This is especially desirable in the street maintenance industry, as well as in commercial projects where significant amounts of hot-mix asphalt are being installed. All that is needed at the site in addition to the rotary dryer 12, pollution control device 14, and supply facility, is water (if it is not already stored in the supply facility) and a convenient stock pile of waste asphalt. Virgin aggregates are needed only to the extent that they are necessary to meet a particular mix design requirement.

Notably, the exemplary pollution control device 14 shown in FIGS. 4 and 5 can be provided with tubes 160 that have an exemplary total outside fiber bed surface area of about 1.296 square feet and can also be provided with an exemplary clean air output rate of about 12,000 actual cubic feet per minute (ACFM) at about 120 degrees F, without exceeding the foregoing dimensional limitations that permit conventional trucking of the pollution control device 14. This clean air output rate can be achieved, for example, when the emissions from the rotary dryer 12 are provided at a rate of 6,265 standard cubic fee per minute (SCFM) and at a temperature of about 200 degrees F. and when ambient air is introduced via the air introduction port 112 at a rate of about 5,144 ACFM at ambient temperature. Within the foregoing dimensional limitations and at the indicated flow rates, the clean air output from the pollution control device 14 advantageously can be provided with an opacity of less than or equal to about 5%. Notably, the fiber bed filter life can be 6 months or as high as one year or more, even if the rotary dryer 12 is used about 8 hours per day.

As shown in FIGS. 4 and 5, the housing 166 can be provided with several access hatches 200 or doors 202. The access hatches 200 or doors 202 can be used to gain access to the contents of the housing 166, for example, when the fiber bed filter 90 is to be replaced or when maintenance or repair of the internal components becomes necessary or desirable.

The pollution control device 14 can be configured to handle as much as 20,000 ACFM of total flow, without exceeding the aforementioned dimensional limitations. This represents a significant advance, especially since the foregoing performance (i.e., an opacity less than or equal to 5%)

is achieved even when the emissions are high in hydrocarbon content, as is typically the case when the emissions are from a rotary drying process carried out on primary ingredients consisting of 100% RAP or commingled RAP with virgin aggregates.

While other pollution control devices might be able to handle flow rates greater than or equal to 20,000 ACFM, without exceeding the aforementioned dimensional limitations, those other devices typically cannot provide the desired opacity of less than or equal to 5% when 100% RAP is introduced into the rotary dryer 12 or when virgin aggregates are commingled with the RAP during introduction into the rotary dryer 12. The hydrocarbon emissions from such RAP processing tends to overwhelm or otherwise exceed the capabilities of the other pollution control devices. Some of the other compact pollution control devices also suffer from one or more of the aforementioned disadvantages, such as excessive complexity, excessive maintenance requirements (labor intensive, frequent servicing, and/or expensive to maintain), and/or excessive costs to implement and operate.

Preferably, the fan 180/damper 182 combination and/or the adjustable-speed fan and the associated ducts are adapted to provide a pressure drop across the fiber bed filter 90 of about 4 to 5 inches water column (W.C.) when the fiber bed filter 90 is clean (or new), and a pressure drop of about 12 inches W.C. when it is time to change the fiber bed filter tubes 160. This advantageously provides a relatively long filter life (e.g., from 6 months between filter changes to as much as one year or more). The exemplar starting pressure range of about 4–5 inches W.C., when combined with the typical fan 180 capabilities of up to about 21 inches W.C. also is compatible with the operating characteristics of the cooling zone 92 and its particulate filtering capabilities.

Generally, based on an exemplary inside diameter of each filter tube 160 of about 4 inches, it is desirable to keep the operating velocity (i.e., the flow rate in ACFM divided by the filter surface area) of the clean air through the filter tubes 160 at or below 40 FPM. When the velocity remains at or below 40 FPM, the exemplary filter tubes 160 operate at a high filtering efficiency. Generally, the fiber bed filter 90 should be used in the high efficiency velocity range associated with the inside diameter of the filter tubes 160. The foregoing total flow rate of 12,000 ACFM at 120 degrees F. can be provided with a velocity of about 17 FPM, which is well within the high efficiency velocity range of the exemplary fiber bed filter 90.

The exemplary embodiment of the pollution control device 14 shown in FIGS. 4 and 5 also includes a temperature sensor T1, a fire detector FD1, a low sump water level switch LSL, a high sump water level switch HSL, a make-up water valve WV, differential pressure transmitters DPI, a visible water level gauge (e.g., a float gauge U), and a recirculation water pressure sensor PIC. The temperature sensor T1 provides a signal indicative of the temperature at the inlet 192 to the pollution control device 14. The fire detection sensor FD1 is located at the inlet 192 to the pollution control device 14. The output from the fire detection sensor FD1 can be used to initiate a fire response protocol when the signal indicates that a fire has been detected. The high and low sump water level switches HSH, LSL can be used to activate and deactivate, or control the speed of the recirculation pump 130 in a manner dependent upon the water level in the coolant recovery mechanism (or sump) 110. The make-up water valve WV can be controlled to selectively open and close to compensate for losses of the coolant (e.g., water) 100 to evaporation. The differential pressure transmitters DPI can be used to provide diagnostic and/or control signals regarding operation of respective segments of the pollution control device 14. The visible water level gauge U, such as a float gauge, can be located on an outside surface of the pollution control device's housing 166 to provide a readily accessible and visible indication of the coolant (e.g., water) level in the coolant recovery mechanism (or sump) 110. The recirculation water pressure sensor PIC is adapted to indicate whether there is water pressure in the coolant recirculation lines.

While other dimensions can be provided, a preferred implementation of the hot-mix asphalt manufacturing system illustrated in FIGS. 1–12 dimensional characteristics.

The entire rotary drum structure preferably is mounted on a frame 210 (shown in FIGS. 2 and 3) that is no longer and wider than the aforementioned dimensional limitations to conventional trucking. The frame 210 therefore can be incorporated into, or mounted on, a truck trailer. The entire rotary dryer 12 and its associated ducts and equipment preferably extends no higher than 11 feet, 6 inches from the top of the frame 210.

The rotatable drum 18 of the rotary dryer 12 preferably has a diameter of about 72 inches and a length of about 25 feet. The combustion chamber 28 preferably has a diameter of about 36 inches and a length of about 46 inches. The circumferential walls 42 of the combustion chamber 28 are about ¼ inch thick and are about 9 to 18 inches away from the inside circumferential wall 30 of the rotatable drum 18. The heat shield 40 can be provided with a diameter of about 22 inches and a thickness of about ¼ inch.

The deflector plate 58 preferably is about 6 inches away from the top 212 of the inside circumferential surface 214 of the combustion chamber 28 and is about 4 inches away from the forward wall 216 of the recirculation transition duct 54. The deflector plate 58 preferably extends about 8 inches into the combustion chamber 28 and about 8 inches into the recirculation transition duct 54. The recirculation transition duct 54 preferably provides a width reduction from about 22 inches to about 16 inches, and a length expansion of from about 22 and ⅝ inches to about 36 inches. The recirculation transition duct 54 has a height of about 12 inches.

The recirculator duct 46 preferably has a diameter of about 24 inches. The plate collector 70 preferably has a width of about 40 inches, a height of about 36 inches, and a thickness of about 8 inches. Each plate 72 in the plate collector 70 thus can have a width of about 8 inches and a length of about 36 inches. The separation between adjacent plates 72 preferably is about one inch, thereby limiting the undulating flow path 76 to a width of about one inch. The peak-to-peak undulation displacement of each plate 72 can be about one inch.

As shown in FIGS. 3, 10, and 11, the plate collector 70 preferably is diagonally arranged inside the rotary dryer's exhaust duct 84. This perhaps is best illustrated in the top view of FIG. 11. The rotary dryer's exhaust duct 84 preferably is about 30 inches by about 37 inches in cross-section. The bottom 218 of the exhaust duct 84 immediately before the plate collector 70 preferably has a right-triangular opening 220 that opens into the pollution control duct 86. The hypotenuse 222 of the right-triangular opening 220 preferably is slightly less than 40 inches in length.

The pollution control duct 86 is connectable to the intake duct 192 of the pollution control device 14. Preferably, the entire pollution control device 14 is supported by a pollution control device frame 224. The pollution control device frame 224 is about 8 feet wide and about 37 feet long. The frame 224 has an intake end 226 and a clean air exhaust end 228. The intake end 226 is where the recirculation pump 130 and motor 132 are mounted for the coolant recovery mechanism 110 and where the intake duct 192 of the pollution control system 14 is carried. Preferably, the housing 166 is about 23 feet long, about 8 feet wide, and less than about 12 feet high.

The cooling zone 92 occupies slightly less than one quarter of the housing's length, closest to the intake end 226 of the frame 224. The remaining length of the housing 166 (closest to the clean air exhaust end 228) is occupied by the fiber bed filter 90.

A method of manufacturing hot-mix asphalt will now be described with reference to the exemplary rotary dryer 12 described above. The manufacturing method includes the steps of providing a rotary dryer 12 and at least one pollution control device 14 with dimensions that permit use of conventional trucking to transport the rotary dryer 12 and pollution control device 14 in less than three conventional truck-loads, feeding primary ingredients of hot-mix asphalt into the rotary dryer 12, drying the primary ingredients of hot-mix asphalt in the rotary dryer 12, and treating emissions from the rotary dryer 12 so that hydrocarbons and particulates are substantially removed from the emissions of the rotary dryer 12 before such emissions are released into a surrounding environment of the rotary dryer 12.

To stay within the aforementioned dimensions limits, the rotary dryer 12 and pollution control device 14 can be configured so that each has length that is less than or equal to about 53 feet, a height that is less than or equal to about 13 feet, 6 inches, and a width is less than or equal to about 8 feet, 6 inches.

Preferably, the step of drying the primary ingredients is performed in a counter-flow manner, and the method further comprises the steps of recirculating emissions from the rotary dryer 12 back into a combustion chamber 28 of the rotary dryer 12 and removing particulates, using the plate collector 70, from the emissions that are recirculated back into the combustion chamber 28. The step of removing the particulates from the recirculated stream of emissions can include spraying of the plate collector 70 to clean away the collected particulates, as described above.

Preferably, the recirculation of emissions back to the combustion chamber 28 is performed so that the temperature of the counter-flowing gases is about 1,000 to 1,200 degrees F. as such gases exit from the combustion chamber 28. The regulation of this temperature can be performed by adjusting the speed of the recirculator fan 50 and/or by modulating the position of the recirculation damper 48.

The step of drying the primary ingredients preferably includes the steps of locating the combustion chamber 28 internally to the rotary dryer 12 and protecting the primary ingredients from radiant heat produced in the combustion chamber 28. Such protection, as indicated above, can be provided using the heat shield 40 and walls 42 of the combustion chamber 28.

Preferably, as indicated above, the step of providing the combustion chamber 28 includes the step of radially spacing the combustion chamber 28 from an inside circumferential wall 30 of the rotary dryer 12, to provide a mixing zone 32 between the combustion chamber 28 and the inside circumferential wall 30 of rotary dryer 12.

If desired, the method may further include the step of introducing supplemental ingredients into the mixing zone 32 of the rotary dryer 12 so that the supplemental ingredients are mixed with the primary ingredients after the primary ingredients have substantially completed a drying treatment in the rotary dryer 12. The supplemental ingredients can include, for example, asphalt cement, rejuvinators, plasticizers, or combinations thereof. Typically, the primary ingredients will have reached a temperature (e.g., about 300 degrees F.979 ) by the time they reach the mixing zone 32 that facilitates mixing of the supplemental ingredients with the primary ingredients. The mixed supplemental and primary ingredients then can exit the rotary dryer 12 through the outlet 26 at or near the opposite end 22 of the rotary dryer 12.

The step of treating emissions from the rotary dryer 12 preferably includes passing the emissions through a fiber bed filter 90 to remove hydrocarbons and particulates from those emissions. Preferably, the emissions are treated by subjecting them to coalescent filtration. Such coalescent filtration can include filtration by Brownian diffusion.

A second exemplary method of manufacturing hot-mix asphalt according to the present invention will now be described. While this second method can be practiced using a rotary dryer 12 and/or pollution control device 14 that satisfy the aforementioned dimensional constraints, it will be appreciated that it also can be practiced using rotary dryers 12 and pollution control devices 14 that do not satisfy the aforementioned dimensional limits.

This second method includes the step of providing a rotary dryer 12 with certain characteristics. In particular, the rotary dryer 12 is provided with 1) a rotatable drum 18 having a first end 20 and an opposite end 22, 2) an inlet 24 for primary ingredients of hot-mix asphalt, the inlet 24 being located at or near the first end 20 of the rotary dryer 12, 3) a combustion chamber 28 that is internal to the rotatable drum 18 of the rotary dryer 12 and that is radially spaced apart from an inside circumferential wall 30 of the rotatable drum 18, to provide a mixing zone 32 between the combustion chamber 28 and the inside circumferential wall 30, and 4) a heat shield 40 adapted to protect the primary ingredients of hot-mix asphalt from radiant heat developed in the combustion chamber 28.

In addition to providing the rotary dryer 12 with the foregoing characteristics, the second method further includes the steps of 1) introducing primary ingredients of hot-mix asphalt into the rotatable drum 18, through the inlet 24, 2) rotating the rotatable drum 18 so that the primary ingredients are conveyed through the rotatable drum 18 toward the opposite end 22 thereof, while combustion gases from the combustion chamber 28 flow substantially from the opposite end 22 of the rotary dryer 12 toward the first end 20 to heat and dry said primary ingredients, and 3) introducing supplemental ingredients into the mixing zone 32 of the rotary dryer 12 so that the supplemental ingredients are mixed with the primary ingredients after the primary ingredients have substantially completed a drying treatment in the rotary dryer 12. Preferably, as indicated above, the supplemental ingredients include asphalt cement, rejuvinators, plasticizers, or combinations thereof.

The second method also preferably includes the step of recirculating combustion gases at the first end 20 back to the combustion chamber 28. As in the case of the first method, the second method can include the step of using a plate collector 70 to remove particulates from the combustion gases that are recirculated back to the combustion chamber 28.

The emissions generated in the rotary dryer 12 by the second method preferably are treated so that hydrocarbons and particulates are substantially removed from such emissions before they are released into a surrounding environment of the rotary dryer 12. This treatment of the emissions can be performed, as indicated above, by passing emissions from the rotary dryer 12 through a fiber bed filter 90 to remove hydrocarbons and particulates from the emissions. Preferably, the emissions are subjected to coalescent filtration when they are treated. Such coalescent filtration can include filtration by Brownian diffusion.

Preferably, the primary ingredients used in the second method include 100% recycled asphalt products (RAP), or virgin aggregates commingled with RAP. This advantageously takes advantage of the useful ingredients in the RAP and conserves virgin aggregates. It also demonstrates the versatility of the second method. The second method is not limited to use with virgin aggregates only.

The present invention also provides a method of treating recirculated gases in a hot-mix asphalt manufacturing system. This method can be practiced, as indicated above, as part of the first and second exemplary manufacturing methods and/or in conjunction with the exemplary system shown in FIGS. 1–12, or alternatively, it can be practiced with other hot-mix asphalt manufacturing methods and/or systems.

The method of treating recirculated gases comprises the steps of directing recirculated gases from a rotary dryer 12 through a plate collector 70; and removing particulates from the recirculated gases as the particulates are propelled, by the recirculated gases, into the plate collector 70. The step of removing particulates preferably is performed so that at least about 90% of the particulates suspended in the recirculated gases are removed therefrom.

Preferably, the method of treating recirculated gases further includes the step of dislodging particulates that collect on the plate collector 70 so that such particulates fall away from the plate collector 70 without continuing with the recirculated gases. This can be accomplished, for example, by spraying the plate collector 70 so that at least some of the particulates removed by the plate collector 70 from the recirculated gases are cleaned away from the plate collector 70. Preferably, spraying of the plate collector 70 is performed using water, so that the water strikes the particulates and falls away from the plate collector 70, carrying at least some of the particulates away from the plate collector 70.

The method of treating recirculated gases also may include the steps of directing excess gases that are not to be recirculated, to at least one pollution control device 14, and treating the excess gases at the pollution control device 14 so that hydrocarbons and particulates are substantially removed from the excess gases before such gases are released into a surrounding environment. Such treatment of the excess gases can be performed, as indicated above, by passing the excess gases through a fiber bed filter 90 and/or by subjecting the excess gases to coalescent filtration. Such coalescent filtration can include filtration by Brownian diffusion.

Also provided by the present invention is a method of treating emissions from a hot-mix asphalt manufacturing system. The emission treatment method can be practiced, as indicated above, as part of the first and second exemplary manufacturing methods, as part of the aforementioned method for treating recirculated gases and/or in conjunction with the exemplary system shown in FIGS. 1–12. Alternatively, the emission treatment method can be practiced with other hot-mix asphalt manufacturing methods and/or systems.

The emission treatment method comprises the steps of directing emissions from a rotary dryer 12 to a fiber bed filter 90, and substantially removing hydrocarbons and particulates from those emissions at the fiber bed filter 90 before such emissions are released into a surrounding environment of the rotary dryer 90. The hydrocarbons and particulates preferably are substantially removed by subjecting the emissions to coalescent filtration. Such coalescent filtration, as indicated above, can include filtration by Brownian diffusion.

Since the typical fiber bed filter will not operate properly when the emissions are provided to the fiber bed filter media at temperatures significantly higher than 120 degrees F. the emission treatment method further comprises the step of cooling the emissions from the rotary dryer 12 enough that such emissions achieve a temperature that is compatible with the fiber bed filter 90 before those emissions reach the fiber bed filter 90. The emission treatment method also may include the step of introducing air that is cooler than the emissions into the emissions after the step of cooling to further cool the emissions prior to entering the fiber bed filter 90.

The step of cooling preferably includes spraying a coolant 100 through the emissions. An exemplary implementation of such spraying is the spraying of coolant (e.g., water) 100 in the cooling zone 92 shown in FIGS. 4 and 5. Preferably, the cooling step includes the step of inducing a cyclonic flow of the emissions in a cooling zone 92, as described above. This can be accomplished, for example, using the cyclonic plate 102 described above.

The step of cooling also may include the step of removing heat from the coolant (e.g., water) 100 before the coolant 100 is sprayed through the emissions. The emission treatment method also preferably comprises the steps of recovering coolant 100 that has been sprayed through the emissions, removing heat from recovered coolant 100 using a heat exchanger 118, and recirculating the coolant 100 by re-spraying the coolant 100 through the emissions.

If the emission treatment method is practiced in conjunction with the aforementioned method for treating recirculated gases, the step of spraying the plate collector 70 can be performed by spraying the plate collector 70 with the same coolant 100 (e.g., water) that is sprayed through the emissions as part of the emission treatment method. The coolant 100 sprayed onto the plate collector 70 also can be recovered and recirculated-by re-spraying that coolant 100 through the emissions and/or also onto the plate collector 70.

The emission treatment method also can include the step of removing particulates entrained in the coolant 100 from the coolant 100 prior to the coolant 100 being re-sprayed through the emissions and/or onto the plate collector 70.

The emission treatment method described above preferably is performed on the emissions from a rotary dryer 12 that is processing 100% recycled asphalt products, or virgin aggregates commingled with recycled asphalt products prior to or during introduction into the rotary dryer 12.

Notably, the aforementioned coalescent filtration and/or Brownian diffusion filtration can be used in the foregoing exemplary methods to provide an exhaust opacity of less than or equal to about 5% even when RAP-containing primary ingredients are being processed. This represents a significant advance over prior methods that would be overwhelmed or otherwise incapable of reliably providing an emissions opacity of 5% or less when RAP-containing ingredients are processed.

While this invention has been described as having a preferred design, it is understood that the invention is not limited to the illustrated and described features. To the contrary, the invention is capable of further modifications, usages, and/or adaptations following the general principles of the invention and therefore includes such departures from the present disclosure as come within known or customary practice in the art to which the invention pertains, and as may be applied to the central features set forth above, and which fall within the scope of the appended claims.

What is claimed is:

1. A transportable hot-mix asphalt manufacturing system comprising:

a rotary dryer adapted to receive and dry ingredients of hot-mix asphalt;

at least one pollution control device adapted to treat emissions from the rotary dryer so that hydrocarbons and particulates are substantially removed from the emissions of the rotary dryer before such emissions are released into a surrounding environment of the rotary dryer;

wherein said at least one pollution control device and said rotary dryer have dimensions that permit use of conventional trucking to transport the rotary dryer and said at least one pollution control device in less than three conventional truck loads;

wherein said rotary dryer is a counter-flow rotary dryer;

wherein said counter-flow rotary dryer includes a recirculator adapted to recirculate emissions from the rotary dryer into a combustion chamber of the rotary dryer; and wherein said at least one pollution control device includes a plate collector adapted to remove particulates from emissions that are recirculated into the combustion chamber by the recirculator.

2. The hot-mix asphalt manufacturing system of claim 1, wherein said at least one pollution control device is configurable so that its length is less than or equal to about 53 feet, its height is less than or equal to about 13 feet, 6 inches, and its width is less than or equal to about 8 feet, 6 inches.

3. The hot-mix asphalt manufacturing system of claim 2, wherein said rotary dryer is configurable so that its length is less than or equal to about 53 feet, its height is less than or equal to about 13 feet, 6 inches, and its width is less than or equal to about 8 feet, 6 inches.

4. The hot-mix asphalt manufacturing system of claim 1, wherein said rotary dryer is configurable so that its length is less than or equal to about 53 feet, its height is less than or equal to about 13 feet, 6 inches, and its width is less than or equal to about 8 feet, 6 inches.

5. The hot-mix asphalt manufacturing system of claim 1, wherein said rotary dryer includes a combustion chamber that is internal to the rotary dryer, said rotary dryer further comprising a heat shield adapted to protect contents of the rotary dryer from radiant heat produced in the combustion chamber.

6. The hot-mix asphalt manufacturing system of claim 5, wherein said combustion chamber is radially spaced apart from an inside circumferential wall of the rotary dryer, to provide a mixing zone between the combustion chamber and the inside circumferential wall.

7. The hot-mix asphalt manufacturing system of claim 5, wherein said at least one pollution control device includes a fiber bed filter.

8. The hot-mix asphalt manufacturing system of claim 7, wherein said fiber bed filter is configured to provide coalescent filtration of emissions from the rotary dryer.

9. A counter-flow rotary dryer for a hot-mix asphalt manufacturing system, said counter-flow rotary dryer comprising:

a rotatable drum having a first end and an opposite end;

an inlet for raw ingredients of hot-mix asphalt, said inlet being located at or near the first end of the rotary dryer;

a combustion chamber that is internal to the rotatable drum of the rotary dryer and that is radially spaced apart from an inside circumferential wall of the rotatable drum, to provide a mixing zone between the combustion chamber and the inside circumferential wall;

a heat shield adapted to protect said raw ingredients of hot-mix asphalt from radiant heat developed in said combustion chamber;

said counter-flow rotary dryer being adapted to receive raw ingredients of hot-mix asphalt through said inlet for passage through the rotatable drum toward the opposite end thereof, while combustion gases from the combustion chamber flow substantially from the opposite end of the rotary dryer toward the first end to heat and dry said raw ingredients;

a recirculator adapted to recirculate said combustion gases at the first end back to the combustion chamber; and a plate collector adapted to substantially remove particulates from combustion gases that are recirculated by the recirculator.

10. The counter-flow rotary dryer of claim 9, further compromising at least one pollution control device adapted to treat emissions from the rotary dryer so that hydrocarbons and particulates are substantially removed from the emissions of the rotary dryer before such emissions are released into a surrounding environment of the rotary dryer.

11. The counter rotary dryer of claim 9, wherein said rotary dryer is adapted to manufacture hot-mix asphalt when said raw ingredients received through said inlet include:

100% recycled asphalt products, or virgin aggregates commingled with recycled asphalt products.

12. The counter-flow rotary dryer of claim 9, wherein said rotary dryer has dimensions that permit use of conventional trucking to transport the rotary dryer in a single conventional truckload.

13. The counter-flow rotary dryer of claim 9, wherein said rotary dryer has a length less than or equal to about 53 feet, a height less than or equal to about 13 feet, 6 inches and a width less than or equal to about 8 feet, 6 inches.

14. A rotary dryer for a hot-mix asphalt manufacturing system, said rotary dryer comprising:

a rotatable drum having a first end and an opposite end;

a combustion chamber located at or near the opposite end;

a recirculator adapted to recirculate some combustion gases at the first end back to the combustion chamber at or near the opposite end; and a plate collector adapted to substantially remove particulates from combustion gases that are recirculated by the recirculator.

15. The rotary dryer of claim 14, further comprising a sprayer adapted to spray the plate collector so that at least some of the particulates removed by the plate collector from the combustion gases are cleaned away from the plate collector.

16. The rotary dryer of claim 15, wherein said sprayer is adapted to spray water on the plate collector so that the water strikes the particulates and falls away from the plate collector. carrying at least some of the particulates away from the plate collector.

17. The rotary dryer of claim 14, further comprising at least one pollution control device adapted to treat emissions from the rotary dryer so that hydrocarbons and particulates are substantially removed from the emissions of the rotary dryer before such emissions are released into a surrounding environment of the rotary dryer.

18. The rotary dryer of claim 17, wherein said at least one pollution control device includes a fiber bed filter.

19. The rotary dryer of claim 18, wherein said fiber bed filter is configured to provide coalescent filtration of emissions from the rotary dryer.

20. The rotary dryer of claim 14, wherein said rotary dryer is a counter-flow rotary dryer and wherein said rotary dryer is adapted to manufacture hot-mix asphalt even when raw ingredients received by the rotatable drum at or near the first end thereof include:
   100% recycled asphalt products, or
   virgin aggregates commingled with recycled asphalt products.

21. The rotary dryer of claim 14, wherein said rotary dryer has dimensions that permit use of conventional trucking to transport the rotary dryer in a single conventional truckload.

22. The rotary dryer of claim 14, wherein said rotary dryer has a length less than or equal to about 53 feet, a height less than or equal to about 13 feet, 6 inches, and a width less than or equal to about 8 feet, 6 inches.

23. The rotary dryer of claim 14, wherein said plate collector removes from the combustion gases that are being recirculated by the recirculator, at least about 90% of the particulates suspended in such combustion gases.

24. A hot mix asphalt manufacturing system comprising:
   a counter-flow rotary dryer adapted to receive and dry ingredients of hot-mix asphalt;
   a pre-filter device adapted to remove particulates from the emissions from the rotary dryer;
   a cooling device adapted to cool the emissions of the rotary dryer, and
   a fiber bed filter adapted to treat emissions from the rotary dryer and to substantially remove hydrocarbons from the emissions of the rotary dryer before such emissions are released into a surrounding environment of the rotary dryer,
   wherein the emissions of the rotary dryer pass through the pre-filter and cooling devices prior to the fiber bed filter.

25. The hot-mix asphalt manufacturing system of claim 24, wherein said cooling device includes a cooling zone adapted to cool the emissions from the rotary dryer enough that such emissions achieve a temperature that is compatible with the fiber bed filter.

26. The hot-mix asphalt manufacturing system of claim 25, wherein said cooling device further includes an air introduction port through which air cooler than said emissions is introduced into said emissions after said cooling zone to further cool said emissions prior to entering the fiber bed filter.

27. The hot-mix asphalt manufacturing system of claim 25, wherein said cooling zone includes at least one coolant sprayer adapted to spray a coolant through the emissions as such emissions pass through the cooling zone.

28. The hot-mix asphalt manufacturing system of claim 27, wherein said at least one coolant sprayer is connected to a heat exchanger adapted to remove heat from the coolant before the coolant is sprayed through the cooling zone.

29. The hot-mix asphalt manufacturing system of claim 28, wherein said heat exchanger is connected to a coolant recovery mechanism adapted to recover and recirculate through the heat exchanger said coolant after it has been sprayed through the cooling zone.

30. The hot-mix asphalt manufacturing system of claim 29, wherein said rotary dryer includes a recirculator adapted to recirculate some combustion gases back to a combustion chamber associated with the rotary dryer, said recirculator being associated with a plate collector adapted to substantially remove particulates from combustion gases that are recirculated by the recirculator; and
   wherein said hot-mix asphalt manufacturing system further comprises a plate collector sprayer adapted to spray the plate collector so that at least some of the particulates removed by the plate collector from the combustion gases are cleaned away from the plate collector.

31. The hot-mix asphalt manufacturing system of claim 30, wherein said plate collector sprayer is fluidly connected at least indirectly to said coolant recovery mechanism so that said coolant is supplied to the plate collector sprayer and is sprayed by said plate collector sprayer to clean particulates away from the plate collector.

32. The hot-mix asphalt manufacturing system of claim 31, further comprising a particulate removal device connected at least indirectly to said coolant recovery system and adapted to remove particulates entrained in the coolant from the coolant prior to said coolant being sprayed by the plate collector sprayer and the coolant sprayer.

33. The hot-mix asphalt manufacturing system of claim 24, wherein said fiber bed filter is configured to provide coalescent filtration of emissions from the rotary dryer.

34. The hot-mix asphalt manufacturing system of claim 24, wherein said rotary dryer is adapted manufacture hot-mix asphalt even when raw ingredients received by the rotary dryer include:
   100% recycled asphalt products, or
   virgin aggregates commingled with recycled asphalt products prior to or during introduction into the rotary dryer.

35. The hot-mix asphalt manufacturing system of claim 24,
   wherein said counter-flow dryer includes a recirculator adapted to recirculate emissions from the rotary dryer into a combustion chamber of the rotary dryer; and
   wherein said recirculator is associated with a plate collector adapted to remove particulates from emissions that are recirculated into the combustion chamber by the recirculator.

36. The hot-mix asphalt manufacturing system of claim 24, wherein said rotary dryer includes a combustion chamber that is internal to the rotary dryer, said rotary dryer further comprising a heat shield adapted to protect contents of rotary dryer from radiant heat produced in the combustion chamber.

37. The hot-mix asphalt manufacturing system of claim 36, wherein said combustion chamber is radially spaced apart from an inside circumferential wall of the rotary dryer, to provide a mixing zone between the combustion chamber and the inside circumferential wall.

38. The hot-mix asphalt manufacturing system of claim 24, wherein said counter-flow rotary dryer comprises:
   a rotatable drum having a first end an opposite end;
   an inlet for raw ingredients of hot-mix asphalt, said inlet being located at or near the first end of the rotary dryer;
   a combustion chamber that is internal to the rotatable drum of the rotary dryer and that is radically spaced apart from an inside circumferential wall of the rotatable drum, to provide a mixing zone between the combustion chamber and the inside circumferential wall;

a heat shield adapted to protect said raw ingredients of hot-mix asphalt from radiant heat developed in said combustion chamber;

a recirculator adapted to recirculate combustion gases at the first end back to the combustion chamber; and said counter-flow rotary dryer being adapted to receive said raw ingredients of hot-mix asphalt through said inlet for passage through the rotatable drum toward the opposite end thereof, while combustion gases from the combustion chamber flow substantially from the opposite end of the rotary dryer toward the first end to heat and dry said raw ingredients.

39. The hot-mix asphalt manufacturing system of claim 24, wherein said rotary dryer is adapted to manufacture hot-mix asphalt wherein said ingredients received by the rotary dryer include:

100% recycled asphalt products, or virgin aggregates commingled with recycled asphalt products.

40. A transportable hot-mix asphalt manufacturing system comprising:

a counter-flow rotary dryer adapted to receive and dry ingredients of hot-mix asphalt, said counter-flow rotary dryer including a combustion chamber and a recirculator adapted to recirculate emissions from the rotary dryer into the combustion chamber, said combustion chamber being internal to the rotary dryer and being radially spaced apart from an inside circumferential wall of the rotary dryer, to provide a mixing zone between the combustion chamber and the inside circumferential wall;

a plate collector adapted to remove particulates from emissions that are recirculated into the combustion chamber by the recirculator;

a fiber bed filter adapted to treat emissions from the rotary dryer so that hydrocarbons and particulates are substantially removed from the emissions of the rotary dryer before such emissions are released into a surrounding environment of the rotary dryer;

a cooling zone between the rotary dryer and the fiber bed filter, said cooling zone being adapted to cool the emissions from the rotary dryer enough that such emissions achieve a temperature that is compatible with the fiber bed filter, said cooling zone including at least one coolant sprayer adapted to spray a coolant through the emissions as such emissions pass through the cooling zone;

a heat exchanger connected at least indirectly to the coolant sprayer, said heat exchanger being adapted to remove heat from the coolant before the coolant is sprayed through the cooling zone;

a coolant recovery mechanism connected at least indirectly to the heat exchanger, said coolant recovery mechanism being adapted to recover and recirculate through the heat exchanger said coolant after it has been sprayed through the cooling zone and a plate collector sprayer adapted to spray the plate collector so that at least some of the particulates removed by the plate collector from the emissions are cleaned away from the plate collector, wherein said hot-mix asphalt manufacturing system has dimensions that permit use of conventional trucking to transport the hot-mix asphalt manufacturing system in less than three conventional truck-loads.

41. The hot-mix asphalt manufacturing system of claim 40, herein hot-mix asphalt manufacturing system is configurable into two conventional truck-loads, each conventional truck-load having a length less than or equal to about 53 feet, a height less than or equal to about 13 feet, 6 inches, and a width less than or equal to about 8 feet, 6 inches.

42. The hot-mix asphalt manufacturing system of claim 41, wherein said rotary dryer is configurable so that its length is less than or equal to about 53 feet, its height is less than or equal to about 13 feet, 6 inches, and its width is less than or equal to about 8 feet, 6 inches.

43. The hot-mix asphalt manufacturing system of claim 40, wherein said rotary dryer is configurable so that its length is less than or equal to about 53 feet, its height is less than or equal to about 13 feet, 6 inches, and its width is less than or equal to about 8 feet, 6 inches.

44. The hot-mix asphalt manufacturing system of claim 40, wherein said rotary dryer further comprises a heat shield adapted to protect contents of the rotary dryer from radiant heat produced in the combustion chamber.

45. The hot-mix asphalt manufacturing system of claim 40, wherein said fiber bed filter is configured to provide coalescent filtration of emissions from the rotary dryer.

46. The hot-mix asphalt manufacturing system of claim 40, wherein said counter-flow rotary dryer is adapted to manufacture hot-mix asphalt when said ingredients include:

100% recycled asphalt products, or virgin aggregates commingled with recycled asphalt products.

47. The hot-mix asphalt manufacturing system of claim 40, further comprising an air introduction port through which air cooler than said emissions is introduced into said emissions after said cooling zone to further cool said emissions prior to entering the fiber bed filter.

48. The hot-mix asphalt manufacturing system of claim 40, wherein said plate collector sprayer is fluidly connected at least indirectly to said coolant recovery mechanism so that said coolant is supplied to the plate collector sprayer and is sprayed by said plate collector sprayer to clean particulates away from the plate collector.

49. The hot-mix asphalt manufacturing system of claim 48, further comprising a particulate removal device connected at least indirectly to said coolant recovery system and adapted to remove particulates entrained in the coolant from the coolant prior to said coolant being sprayed by the plate collector sprayer and the coolant sprayer.

50. A hot-mix asphalt manufacturing system comprising:

a rotary dryer adapted to receive and dry ingredients of hot-mix asphalt;

at least one pollution control device adapted to treat emissions from the rotary dryer so that hydrocarbons and particulates are substantially removed from the emissions of the rotary dryer before such emissions are released into a surrounding environment of the rotary dryer, said at least one pollution control device including a fiber bed filter;

said at least one pollution device includes a cooling zone adapter to cool the emissions from the rotary dryer enough that such emissions achieve a temperature that is compatible with the fiber bed filter;

said at least one pollution control device includes an air introduction port through which air cooler than said emissions is introduced into said emissions after said cooling zone to further cool said emissions prior to entering the fiber bed filter;

said at least one coolant sprayer adapted to spray a coolant through the emissions as such emissions pass through the cooling zone;

said at least one coolant sprayer is connected to a heat exchanger adapted to remove heat from the coolant before the coolant is sprayed through the cooling zone;

said heat exchanger is connected to a coolant recovery mechanism adapted to recover and recirculate through the heat exchanger said coolant after it has been sprayed through the cooling zone;

said rotary dryer includes a recirculator adapted to recirculate some combustion gases back to a combustion chamber associated with the rotary dryer, said recirculator being associated with a plate collector adapted to substantially remove particulates from combustion gases that are recirculated by the recirculator; and wherein said hot-mix asphalt manufacturing system further compresses a plate collector sprayer adapted to spray the plate collector so that at least some of the particulates removed by the plate collector from the combustion gases are cleaned away from the plate collector.

51. The hot-mix asphalt manufacturing system of claim 50, wherein said plate collector sprayer is fluidly connected at least indirectly to said coolant recovery mechanism so that said coolant is supplied to the plate collector sprayer and is sprayed by said plate collector sprayer to clean particulates away from the plate collector.

52. The hot-mix asphalt manufacturing system of claim 51, further comprising a particulate removal device connected at least indirectly to said coolant recovery.

53. A hot-mix asphalt manufacturing system comprising:

a rotary dryer adapted to receive and dry ingredients of hot-mix asphalt; and at least one pollution control device adapted to treat emissions from rotary dryer so that hydrocarbons and particulates are substantially removed from the emissions of the rotary dryer before such emissions are released into a surrounding environment of the rotary dryer, said at least one pollution control device including a fiber bed, filter;

said rotary dryer is a counter-flow rotary dryer;

said counter-flow rotary dryer includes a recirculator adapted to recirculate emissions from the rotary dryer into a combustion chamber of the rotary dryer; and said at least one pollution control device includes a plate collector adapted to remove particulates from emissions that are recirculated into the combustion chamber by the recirculator.

\* \* \* \* \*